(12) United States Patent
Falada et al.

(10) Patent No.: US 7,034,710 B2
(45) Date of Patent: Apr. 25, 2006

(54) APPARATUS AND METHOD FOR DISPLAYING INFORMATION RELATED TO A MACHINE

(75) Inventors: Gregory J. Falada, Metamora, IL (US); Rodney L. Schoonover, Goodfield, IL (US); Joe E. Forcash, Peoria, IL (US); David B. Vernon, Peoria, IL (US)

(73) Assignee: Caterpillar Inc, Peoria, IL (US)

( * ) Notice: Subject to any disclaimer, the term of this patent is extended or adjusted under 35 U.S.C. 154(b) by 466 days.

(21) Appl. No.: 10/027,025

(22) Filed: Dec. 20, 2001

(65) Prior Publication Data

US 2002/0099520 A1 Jul. 25, 2002

Related U.S. Application Data

(60) Provisional application No. 60/257,209, filed on Dec. 20, 2000.

(51) Int. Cl.
*G08B 21/00* (2006.01)

(52) U.S. Cl. ............... 340/679; 340/691.6; 340/539.24; 340/990

(58) Field of Classification Search ................. 340/679, 340/438, 755, 752, 680, 691.6, 539.19, 539.16, 340/539.24, 539.18, 539.14, 505, 990
See application file for complete search history.

(56) References Cited

U.S. PATENT DOCUMENTS

| 5,347,260 | A | * | 9/1994 | Ginzel et al. ............... 340/438 |
| 5,400,018 | A | * | 3/1995 | Scholl et al. .............. 340/10.3 |
| 5,463,567 | A |   | 10/1995 | Boen et al. |
| 5,648,898 | A | * | 7/1997 | Moore-McKee et al. ..... 700/86 |
| 5,808,907 | A |   | 9/1998 | Shetty et al. |
| 6,204,772 | B1 |   | 3/2001 | DeMay et al. |
| 6,385,494 | B1 | * | 5/2002 | Blahnik et al. ............... 700/86 |
| 6,408,232 | B1 | * | 6/2002 | Cannon et al. ............ 340/991 |
| 6,584,403 | B1 | * | 6/2003 | Bunn ......................... 340/988 |

* cited by examiner

*Primary Examiner*—Jeffery Hofsass
*Assistant Examiner*—Daniel Previl
(74) *Attorney, Agent, or Firm*—Howard & Howard; W. Bryan McPherson

(57) ABSTRACT

A system and method for displaying information related to the status of at least one machine of a plurality of machines. This system includes a data module coupled to each of the plurality of machines. The data module is adapted to collect and store information related to the corresponding machine. A data link is coupled to the data module. A display module is coupled through the data link. The data link is adapted to transmit data information between the data module coupled to each machine and the display module. The display module is adapted to display information relating from only a subset of the plurality of machines. The subset is selected from the plurality of machines as a function of machine parameters input by a user.

50 Claims, 32 Drawing Sheets

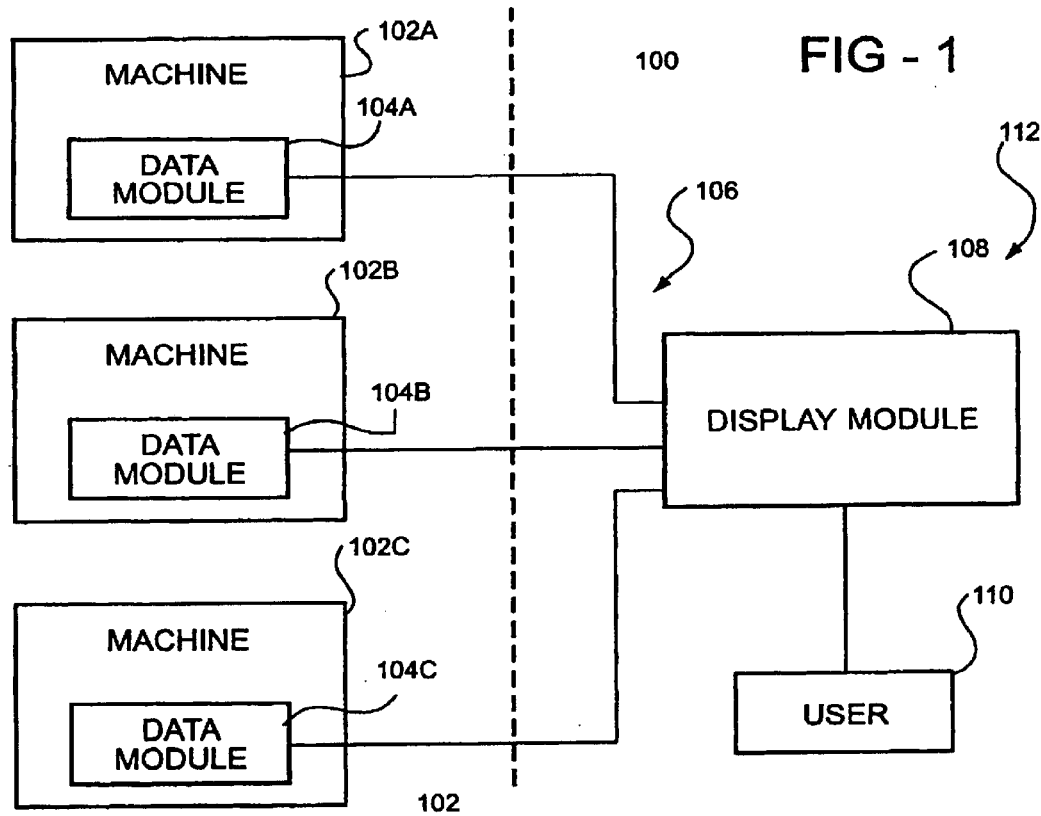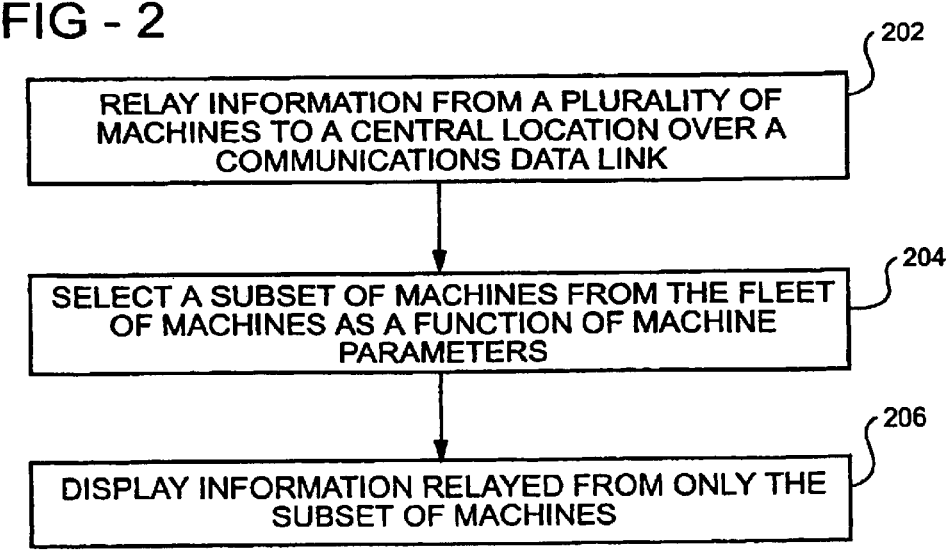

FIG-14

| Status | Make | Model | Serial | Unit | Date / Time | Power Loss | Satellite Blocked | Active |
|---|---|---|---|---|---|---|---|---|
| | AA | CHAL55 | 7DM01494 | H39000037 | 04/26/2000 12:52:36 PM | | | No |
| | AA | CHAL55 | AEN00410 | H39000042 | 04/26/2000 12:50:41 PM | | | No |
| | AA | CHAL35 | 8DN00372 | H39000029 | 04/26/2000 12:49:35 PM | | | No |
| | AA | D250E | 5TN01156 | B19000009 | 04/26/2000 12:39:29 PM | | | No |
| | AA | D9R | 8BL01064 | D43000009 | 04/26/2000 12:39:09 PM | Yes | | No |
| | AA | CHAL35 | 8DN00525 | H39000018 | 04/26/2000 12:21:36 PM | | | No |
| | AA | D5C | 6CS00467 | B19000011 | 04/26/2000 12:18:20 PM | | | No |
| | AA | CHAL65C | 2ZJ02409 | E25000001 | 04/26/2000 12:07:14 PM | | | No |
| | AA | D6X | AAX00006 | N02000000 | 04/26/2000 12:06:43 PM | No | No | No |
| | AA | D5M | 6GN01196 | EAE100004 | 04/26/2000 12:04:27 PM | No | | No |
| | AA | 416C | 4ZN17140 | B19000024 | 04/26/2000 11:58:33 AM | | | No |
| | AA | 973 | 66G00646 | E25000001 | 04/26/2000 11:53:47 AM | | | No |
| | AA | D6MXB | ALH00002 | EAE100004 | 04/26/2000 11:51:55 AM | No | No | No |
| | AA | CHAL45 | 1DR01733 | H39000005 | 04/26/2000 11:50:47 AM | | | No |
| | AA | CHAL45 | 1DR01740 | H39000031 | 04/26/2000 11:45:56 AM | | | No |
| | AA | CHAL65C | 2ZJ02434 | H39000021 | 04/26/2000 11:44:36 AM | | | No |
| | AA | 776D | 2YW00094 | E35000006 | 04/26/2000 11:37:48 AM | No | No | No |
| | AA | CHAL85C | 9TK01973 | H39000034 | 04/26/2000 11:23:29 AM | | | No |

Status History | Product Watch Details | Close

APPARATUS AND METHOD FOR DISPLAYING INFORMATION RELATED TO A MACHINE

This application claims the benefit of prior provisional patent application Ser. No. 60/257,209 filed Dec. 20, 2000.

TECHNICAL FIELD

The present invention relates generally to an apparatus and method for displaying information related to a machine, and more particularly, to a system and method for relaying information from a plurality of machines and displaying information related to a subset of the plurality of machines.

BACKGROUND

Emerging technologies have enabled remote work locations to become safer, more efficient and more automated. For example, increased diagnostic capabilities have allowed work vehicles at a work site to perform on-board diagnostics to reduce downtime by preventing certain kinds of breakdowns. These systems allow for preventative maintenance.

These diagnostic systems and advanced sensor arrays produce a tremendous amount of information. This information allows the operating level of the vehicle, that is, its performance, efficiency, and other operating characteristics to be known at all times.

Some of this information may be used on board the vehicle to perform low level diagnostics. However, due to on-board computing power limitations and the lack of operator expertise in using this information to diagnose the vehicle and its systems, the information is more useful off-board the vehicle. Off-board this information may be used to perform diagnostics, prognostics (the ability to prevent a breakdown before it occurs), and also to develop new diagnostics and prognostics.

There are a number of ways in which information may be relayed from a vehicle to a location where it can be used fully. For example, the vehicle could be equipped with a control module which includes a storage medium such as a battery backed static ROM. An external computer, such as a portable or laptop computer, may be connected to a data link on the vehicle and information downloaded to the external computer.

Another way that information may be transferred from the vehicle to the remote location is through a communications, for example, satellite, radio, or other radio frequency means. A number of telecommunications companies provide a service of transferring data from one location to another through the use of a telecommunications satellite. This provides increased flexibility since the vehicle does not have to be at a certain location for information to be transferred. Furthermore, this method also saves time since a technician does not have to download the information physically. Also, the transfer can be practically instantaneous. This allows for faster response to problems which have developed or are about to develop.

The information gathered from such vehicles may be useful in many different ways. For example, a fleet manager may use the information to schedule and review work schedules. Additionally, a service center and/or a dealer may use the information to review the status, schedule maintenance and to diagnose problems related to a fleet or plurality of vehicles.

The present invention is directed at solving one or more of the problems as set forth above.

DISCLOSURE OF THE INVENTION

In one aspect of the present invention, a method for displaying information relating to the status of at least one machine of a plurality of machines is provided. The method includes the steps of relaying the information from the plurality of machines to a central location over a communications data link, selecting a subset of machines from the plurality of machines as a function of machine parameters, and displaying information related from only the subset of machines.

In another aspect of the present invention, a system for displaying information related to the status of at least one machine of a plurality of machines is provided. This system includes a data module is coupled to each of the plurality of machines. The data module is adapted to collect and store information related to the corresponding machine. A data link is coupled to the data module. A display module is coupled through the data link. The data link is adapted to transmit data information between the data module coupled through each machine and the display module. The display module is adapted to display information relating from only a subset of the plurality of machines. The subset is selected from the plurality of machine as a function of machine parameters input by a user.

BRIEF DESCRIPTION OF THE DRAWINGS

FIG. 1 is a block diagram illustrating a system for displaying information relating to the status of a subset of machines from a plurality of machines, according to an embodiment of the present invention;

FIG. 2 is a flow diagram illustrating a method for displaying information relating to the status of at least one machine from a plurality of machines, according to an embodiment of the present invention;

FIG. 14 is a diagrammatic illustration of a Status Dialog, according to an embodiment of the present invention;

DETAILED DESCRIPTION

Figure 3:
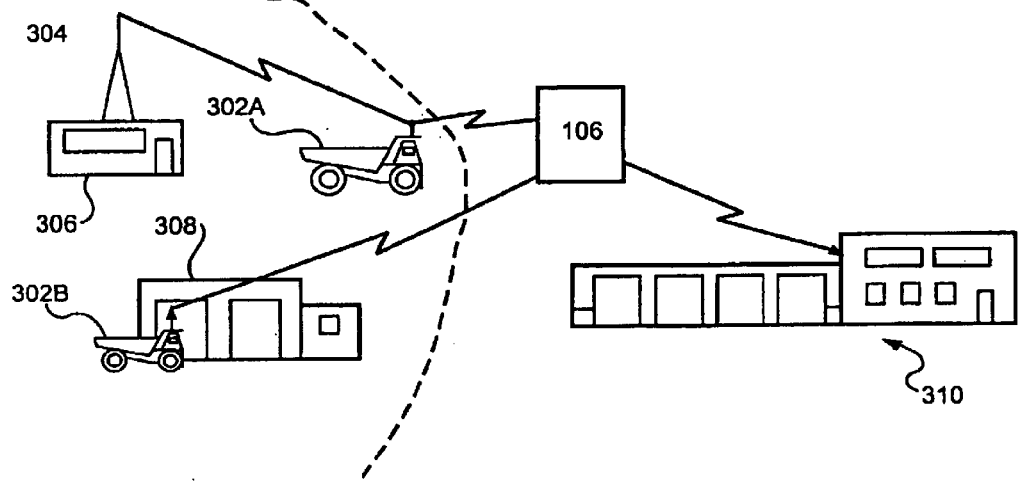
FIG. 3 is a diagram illustration of a fleet or plurality of machines 302 operating at a work site, according to an embodiment of the present invention.

With reference to the drawings and in operation, the present invention provides a system 100 and method for displaying information relating to the status of a subset of machines from a plurality of machines. With reference to FIG. 1, only three machines 102A, 102B, 102C are shown. A data module 104 is coupled to each of the plurality of machines 102A, 102B, 102C. The data module 104 is adapted to collect and store information related to the corresponding machine 102A, 102B, 102C.

A data link 106 is coupled to the data module 104.

A display module 108 is coupled to the data link 106. The data link is adapted to transmit data and information between the machines 102A, 102B, 102C and the display module 108. The display module 108 is adapted to display information relayed from only a single machine or a subset of the plurality of machines 102A, 102B, 102C. The single machine or subset of the machines 102A, 102B, 102C is selected from the plurality of machines as a function of machine parameters input by a user 110. Preferably, the display module 108 is located at a central location 112, such as a dealer, retail store, or manufacturer facility.

With reference to FIG. 2, a method for displaying information relating to the status of at least one machine 102A, 102B, 102C of the plurality of machines 102A, 102B, 102C is provided. In a first control block 202, information from the plurality of machines 102A, 102B, 102C is relayed to a central location 112 over the communications data link 106. In a second control block 204, a subset of machines 102A, 102B, 120C is selected from the fleet or plurality of machines 102A, 102B, 102C as a function of machine parameters input by the user 110. In a third control block 206, only the information from the subset of machines 102A, 102B, 102C selected by the user 110 is displayed.

The present invention may be adapted to display information from any sort of machine 102A, 102B, 102C. For the purpose of this invention, a machine includes remote computer systems, automobiles, engines, generators, work machines, or any other type of machine, piece of equipment or product in general, including any other consumer goods, for which data is collected.

For example, with reference to FIG. 3, the present invention may be adapted to display machine information from a fleet or plurality of vehicles 302. For discussion purposes only, the fleet is comprised of two vehicles, a first and second vehicle or work machines 302A, 302B. The fleet of vehicles 302 is shown situated at a worksite 304, for example, a mine site. For simplicity, two vehicles 302A, 302B are shown, but a mine site will typically utilize a large number and variety of vehicles, all of which may generate information utilized by the present invention.

At the mine site 304 are located a dispatcher 306 and a service center 308. The dispatcher 306 coordinates the operation of the mine site, including scheduling of the vehicles' operation and scheduling vehicle maintenance. The service center 308 performs routine maintenance and repairs.

The vehicles 302A, 302B and/or the dispatcher 306 and service center 308 generate a set of data or information relating to their operation. In one embodiment, the data module 104 of each vehicle 302A, 302B relays the stored information across the data link 106 to a central location 310. The central location 310, may be for example, the facilities of a dealer who sold and/or serviced the machines 302A, 302B or, alternatively, may be the facilities of a manufacturer who produces machines and accumulates the stored information data to pass to a dealer who sold and/or serviced the machines 302A, 302B.

For the purposes of this invention, the fleet or plurality of machines 102, 302, may be defined as all, or a portion, of the machines that have been sold and/or serviced by the dealer, or all, or a portion, of the machines of a particular customer or all, or a portion, of machines at a particular work site.

As discussed below, the user 110 sets a number of machine parameters which are used to select a subset of the fleet of machines 102, 302. The subset of the machines 102, 302, may include one machine or a plurality of machines or all of the machines in the fleet. The user 110 may also request specific information from a machine or subset of machines 102A, 102B, 102C, schedule communications to and from machines, and preset the system's 100 response to receipt of specific machine messages (see below).

Exemplary machine parameters may include machine make (manufacturer), machine model, machine serial number, and/or a machine identifier. The machine parameters may also include a distance from a selected location, a rental status, a registration status, a date and time stamp, a service meter update, a fuel level, diagnostic information and/or status information. Information from the machines 102, 302 may be relayed to the display module 108 periodically, as required, or in response to a machine condition. Systems and methods for relaying information from machines over a data communications channel are disclosed in U.S. Pat. No. 5,400,018 issued to Rolland D. Scholl, et al, on Mar. 21, 1995 and U.S. patent application Ser. No. 09/404,014 filed, Sep. 23, 1999, which are herein incorporated by reference.

In the preferred embodiment, the data communications link 106 is a satellite communications network, including, at least one satellite. In the preferred embodiment, satellite communications are purchased as a service.

Each machine or work vehicle 102, 302 includes a data module 104. In the preferred embodiment, the data module 104 is microprocessor based. The data module 104 receives data from a plurality of sources on the machine or vehicles. For example, the types of sources include sensors and/or electronic control modules (ECM). Typically, electronic control modules are used to control one subsystem of the vehicle, for example, the vehicle's engine or transmission. The ECM uses sensor information and may also generate its own set of parameters. The ECM may transfer the sensor information it receives and some of the parameters it generates internally to the data module 104.

In the preferred embodiment, the system 100 and method of the present invention is embodied in a computer program product, i.e., software. The computer program product comprises a computer useable storage medium having computer readable program code means embodied in the medium.

With reference to FIGS. 4–38, the present invention provides a graphical user interface 400 for use by the user 110 to interface with the system 100.

The graphical user interface 400 includes Menu Bar 402, a Tool Bar 404, a Product Link System Panel 406 and a Status Bar 408.

Figure 5:
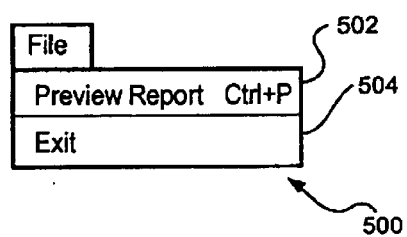
FIG. 5 is a diagrammatic illustration of a File Submenu.

With reference to FIG. 5, the Menu Bar 402 includes a File Submenu 500 including a Preview Report Item 502 and an Exit Item 504. Selection of the Preview Report Item 502 displays a preview of the report generated by the product link system. Selection of the Exit Item 504 exits the computer program.

Figure 6:
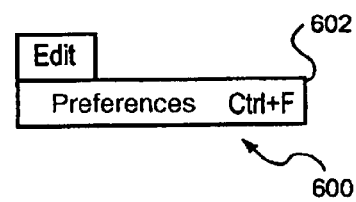
FIG. 6 is a diagrammatic illustration of an Edit Submenu.

With reference to FIG. 6 the Menu Bar 402 includes an Edit Submenu 600. The Edit Submenu 600 includes a Preferences Item 602.

Upon actuation of the Preferences Item 602, a preferences dialog is displayed (not shown). The preferences dialog allows the user 110 to change: the country, the units used to measure and display distances, the number of records displayed, a default make or manufacturer, the date format used by the system 100, the date and time format and time zone, a default location type, and a mapping program.

Figure 7:
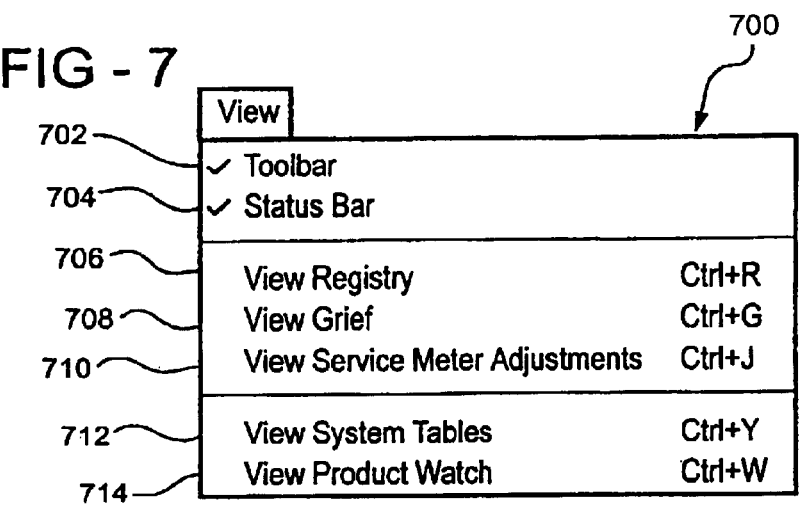
FIG. 7 is a diagrammatic illustration of a view submenu.

With reference to FIG. 7, the Menu Bar 402 includes a View Submenu 700. The View Submenu 700 includes a Toolbar Item 702 and a Status Bar Item 704. The View Submenu 700 further includes a View Registry Item 706, a View Grief Item 708 and a View Service Meter Adjustment Item 710. Additionally, the View Submenu 700 includes a View System Tables Item 712 and a View Product Watch Item 714. Selection of the Toolbar Item 702 toggles the toolbar 404 on and off. Selection of the Status Bar Item 704 toggles the Status Bar 408 on and off.

Figure 8:
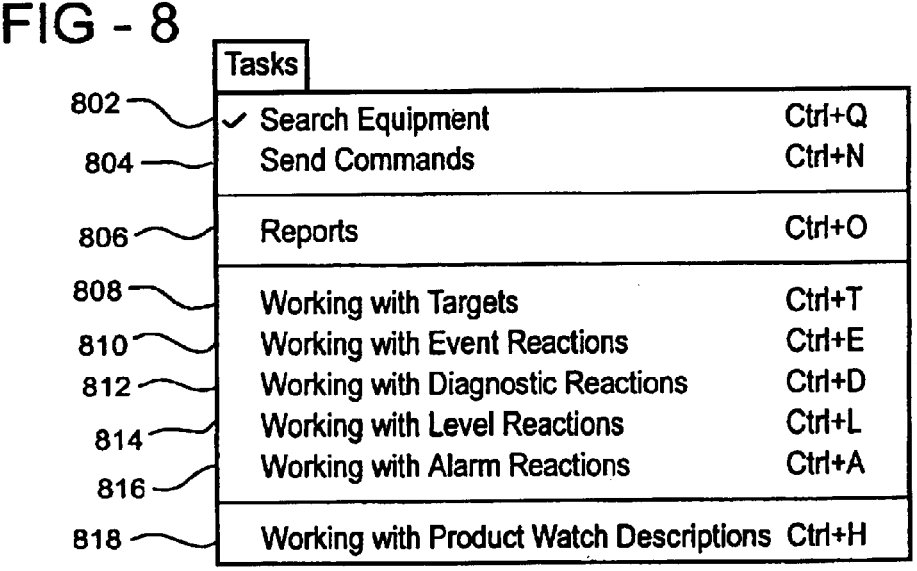
FIG. 8 is a diagrammatic illustration of a Tasks Submenu.

With reference to FIG. 8, the Menu Bar 402 includes a Tasks Submenu 800. The Tasks Submenu 800 includes a Search Equipment Item 802 and a Send Command Item 804, and a Reports Item 806. The Tasks Submenu 800 also includes a Working With Targets Item 808, a Working With Event Reactions Item 810, a Working With Diagnostic Reactions Item 812, a Working With Level Reactions Item 814 and a Working With Alarm Reactions Item 816. The Tasks Submenu 800 also includes a Working With Product Watch Descriptions Item 818.

Figure 9:
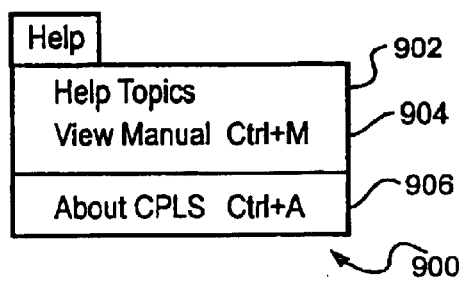
FIG. 9 is a diagrammatic illustration of a help menu.

With reference to FIG. 9, the Menu Bar 402 includes a Help Submenu 900. The Help Submenu 900 includes a Help Topics Item 902, a View Manual Item 904, and About Item 906.

Figure 10:
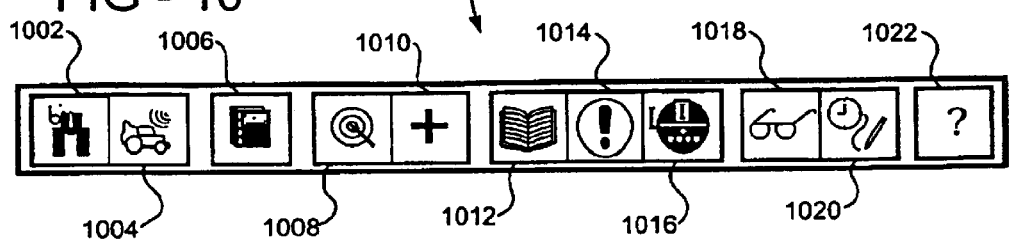
FIG. 10 is a diagrammatic illustration of a Tool Bar of the graphical user interface of FIG. 4, according to an embodiment of the present invention.
Figure 4:
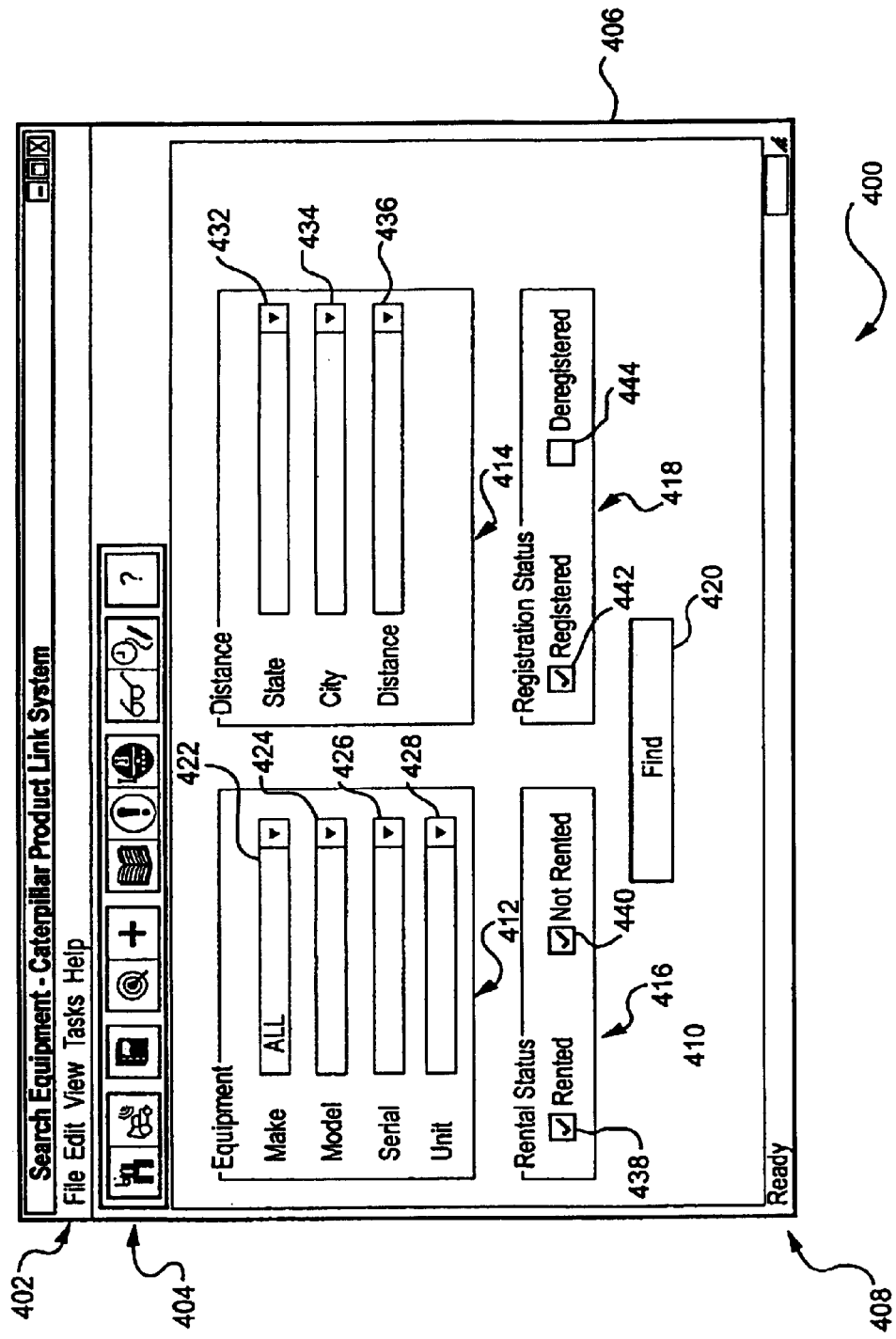
FIG. 4 is a diagrammatic illustration of a graphical user interface, according to an embodiment of the present invention.

With reference to FIG. 10, the Button Bar 404 includes a Search Equipment Button 1002, a Send Command Button 1004, a Reports Button 1006 and a Targets Button 1008. The Button Bar 404 also includes a Reactions Button 1010, a View Registry Button 1012, a Grief Button 1014, and a Service Meter Adjustments Button 1016. The Button Bar 404 further includes a Product Watch Button 1018, a Product Watch Description Button 1020 and a Help Button 1022.

Returning to FIG. 4, upon initialization of the computer program or actuation of the Search Equipment Button 1002, a Search Equipment Screen 410 is displayed in the Product Link System Panel 406. The Search Equipment Panel 410 includes an Equipment Information Section 412, a Distance Section 414, a Rental Status Section 416 and a Registration Status Section 418. The Search Equipment Panel 410 also includes a Find Button 420.

The Equipment Information Section 412 includes a Machine Make Dropdown List 422, a Machine Model Dropdown List 424, a Serial Number Dropdown List 426, and a Unit Identifier Dropdown List 428.

The Distance Section 414 includes a State Dropdown List 432, a City Dropdown List 434, and a Distance Dropdown List 436.

The Rental Status Section 416 includes a Rented Check Box, 438, and a Not Rented Check Box 440. The Registration Status Section 418 includes a Registered Check Item 442 and a Deregistered Check Item 444.

Upon initialization of the computer program or actuation of the Search Equipment Button 1002, all fields within the Equipment Information Section 412, Distance Section 414, Rental Status Section 416 and Registration Status Section 418 are set to default value. The user 110 manipulates the Dropdown Lists 422, 424, 426, 428, 432, 434, 436, and Check Boxes 438, 440, 442, 444 to identify the machine subset of the machines 102, 302 to include.

Once the user 110 has identified or manipulated all of the data, the user 110 actuates the Find Button 420 to generate a report.

Figure 11:
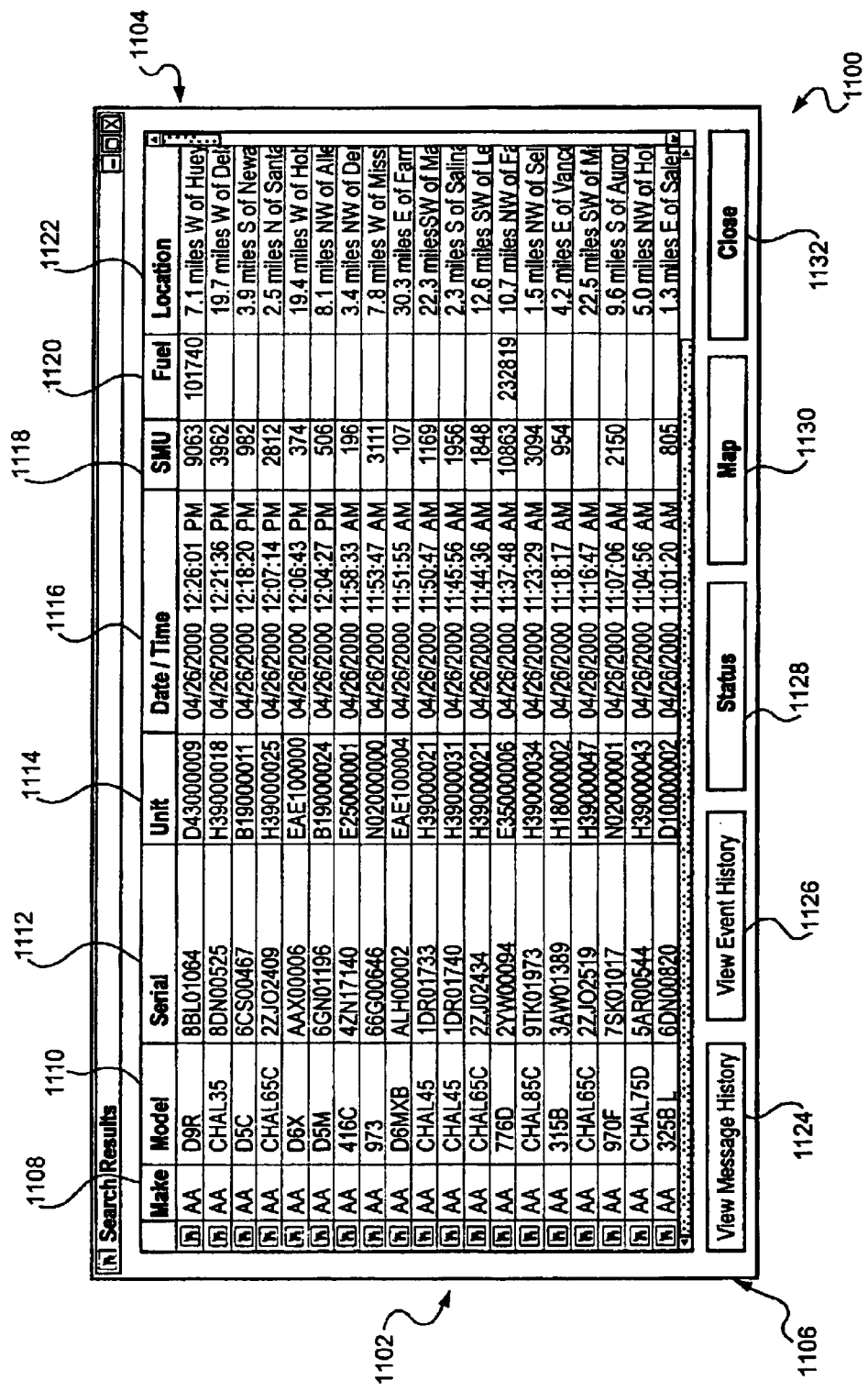
FIG. 11 is a diagrammatic illustration of a search result dialog of the system of FIG. 1.

With reference to FIG. 11, upon actuation of the Find Button 420 in the Search Equipment Panel 410, a Search Results Dialog 1100 is displayed. In the preferred embodiment, the Search Results Dialog 1100 includes a List Section 1102 having a plurality of columns 1104 and rows 1106. All machines 102, 302 which meet the criteria set upon in the Search Equipment Panel 410 are listed in the row, 1106. Information regarding the subset of machines 102, 302 is displayed in each of the columns. For example, as shown, the Search Results Dialog 1100 includes a Make Column 1108, a Model Column 1110, a Serial Number Column 1112, a Unit Identifier Column 1114, a Date Time Column 1116, a Service Hours Column 1118 a Fuel Column 1120, and a Location Column 1122.

The Search Results Dialog 1100 also includes a View Message History Button 1124, a View Events History Button 1126, a Status Button 1128, a Map Button 1130 and a Close Button 1132. Actuation of the Close Button 1132 closes the Search Results Dialog 1100. Actuation of the View Message History and View Event History Buttons 1124, 1126, display corresponding dialogs (see below) for a highlighted machine.

Actuation of the Status Button 1128 displays a status screen dialog (see below). Actuation of the map button 1130 launches a separate atlas software application, for example Delonne's Street Atlas U.S.A. 6.0.

Figure 12:
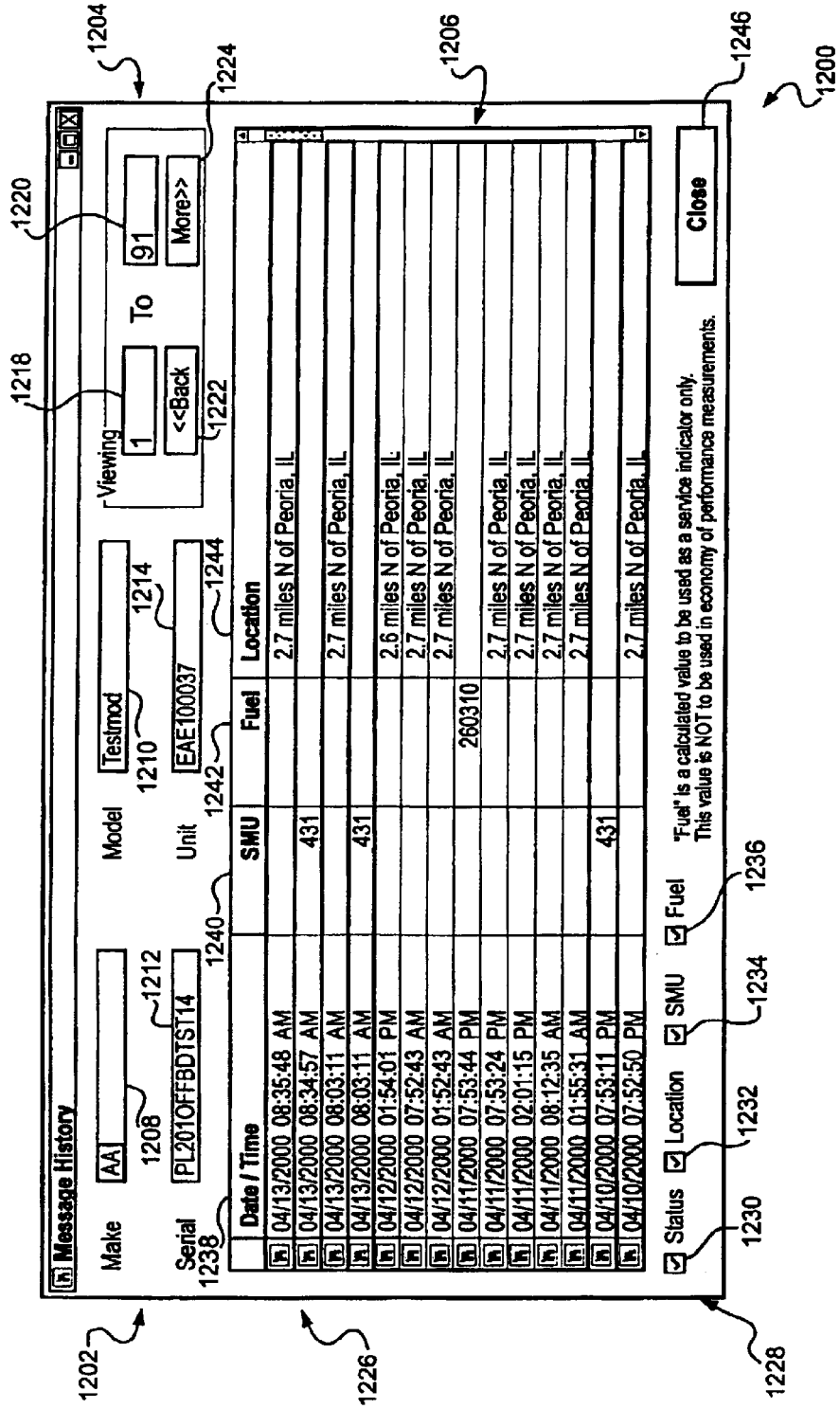
FIG. 12 is a diagrammatic illustration of a message history dialog of the system of FIG. 1.

With reference to FIG. 12, upon actuation of the View Message History Button 1124, a Message History Dialog 1200 is displayed. The Message History Dialog 1200 displays the communications between the selected machine 102, 302 and the display module 108. The Message History Dialog 1200 includes a Machine Information Section 1202, a Viewing Section 1204, and a List Section 1206. The Machine Information Section 1202 in the preferred embodiment includes a Make Text Box 1208, a Model Text Box 1210, a Serial Number Text Box 1212 and a Unit Identifier Text Box 1214. The Machine Information Section 1202 is used to identify the selected machine 102, 302.

The Viewing Section 1204 includes a Start Message Box 1218 and an End Message Box 1220 which identify the first and last message displayed in the List Section 1206. The Viewing Section 1204 also includes a Back Button 1222 and a More Button 1224 which are used to manipulate the messages displayed. The List Section 1206 includes a plurality of columns 1226 and rows 1228. Messages or communications between the corresponding machine, 102, 302 and the display module 108 are listed in the rows 1228. Certain machine parameters are displayed in the columns 1226. In the preferred embodiment, the Message History Dialog 1200 includes a Status Check Box 1230, a Location Check Box 1232, an SMU Check Box 1234 and Fuel Check Box 1236. The Check Boxes 1230, 1232, 1234, 1236 are used to enable the columns 1226. As shown, the List Section 1206 includes a Date Time Column 1238, an SMU column 1240, a Fuel Column 1242, and a Location Column 1244. The message history dialog further includes a Closed Button 1246. Upon actuation of the Closed Button 1246, the message history dialog is closed.

Figure 13:
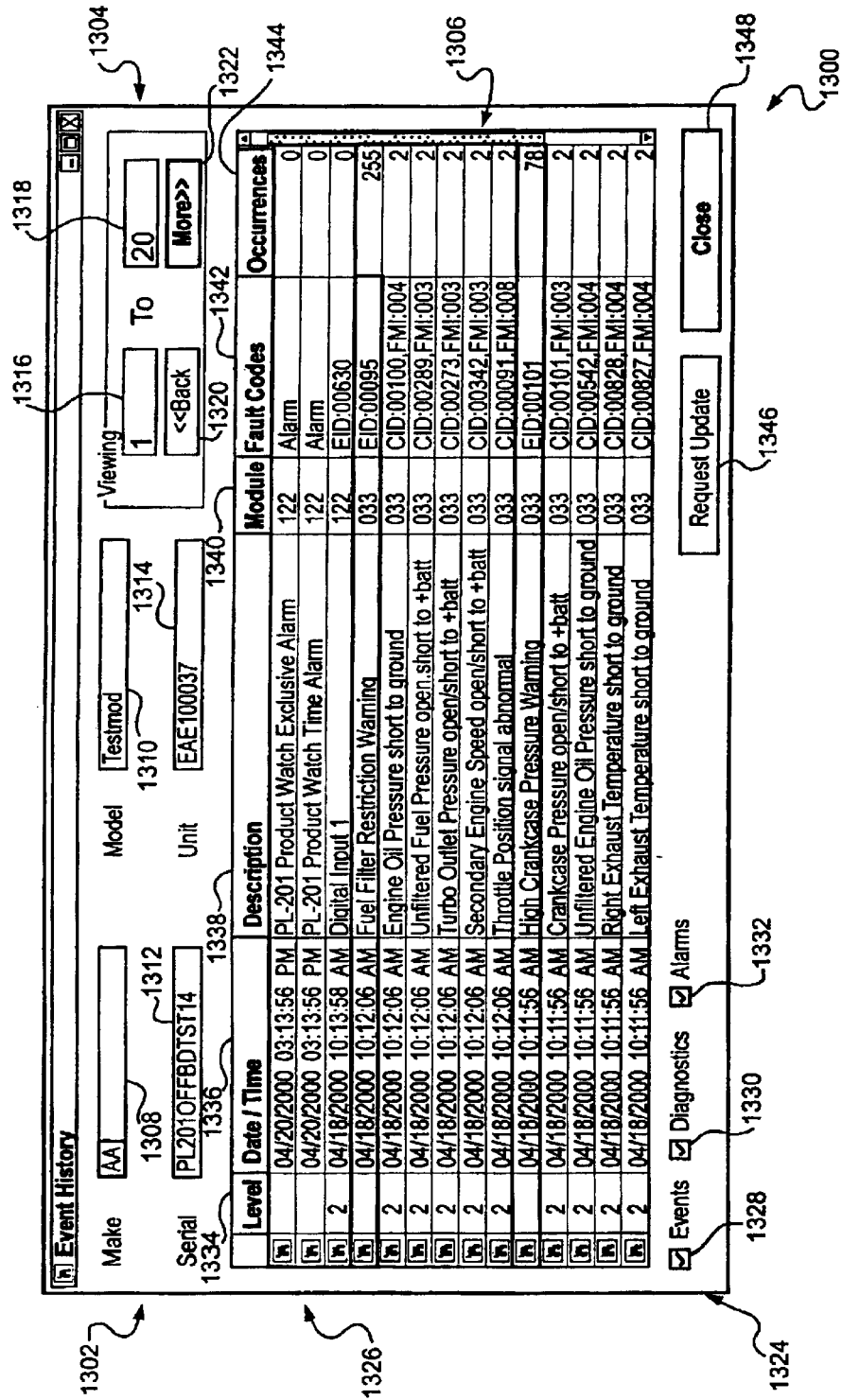
FIG. 13 is an event history dialog of the system of FIG. 1.

With reference to FIG. 13, upon actuation of the View Event History Button 1126 in the Search Results Dialog 1100, an Events History Dialog 1300 is displayed. The Event History Dialog 1300 includes a Machine Information Section 1302, a Viewing Section 1304, and a List Section 1306. The Machine Information Section 1302 includes a Machine Make Text Box 1308, a Model Text Box 1310, a Serial Number Text Box 1312, and a Unit Identifier Text Box 1314.

The Machine Information Section 1302 is used to identify the selected machine 102, 302. The Viewing Section 1304 includes a Start Event Box 1316, an End Event Box 1318 a Back Button 1320 and, a More Button 1322. The current messages displayed are identified in the Start Box 1316 and End Box 1318. The messages displayed in the List Section 1306 are further manipulated by the Back Button 1320 and the More Button 1322.

The List Section 1306 includes a plurality of rows 1324 and columns 1326. The events for the corresponding machine 102, 302 are listed in the rows 1324. Machine parameters for each event listed are displayed in the columns 1326. The Event History Dialog 1300 further includes an Event Check Box 1328 a Diagnostics Check Box 1330, an Alarm Check Box 1332. The Check Boxes 1328, 1330 and 1322 are used to toggle the information displayed in the list 1306.

As shown, the List 1306 includes a Level Column 1334, a Date Time Stamped Column 1336, a Description Column 1338, a Module Column 1340, a Codes Column 1342 and an Occurrences Column 1344. The Modules Column 1340 identifies a particular module on the machine 102, 302 from which a particular event originated. The Occurrences Column 1344 includes a number representing the number of times a particular event occurred.

The Event History Dialog 1300 further includes a Request Update Button 1346 and a Close Button 1348. Actuation of the Request Update Button 1346 sends a request over the data link 106 for an update of the parameters of the corresponding machine 102, 302. Actuation of the Closed Button 1348 closes the Event History Dialog 1300.

With reference to FIG. 14, upon actuation of the Status Button 1128 on the Search Results Dialog 1100, a Status Dialog 1400 is displayed. The Status Dialog 1400 shows the status all of the machines 102, 302 identified in the Search Results Dialog 1100. The Status Dialog includes a List 1402 having a plurality of rows 1404 and columns 1406. The machines 102, 302, in the Search Results Dialog 1100 are listed again in the rows 1404. Machine parameters of each of the machines listed 102, 302 are listed in the columns 1406. As shown in the Status Dialog 1400 the columns 1406 include a Make Column 1408, a Model Column 1410, a Serial Number Column 1412, a Unit Identifier Column 1414, a Date/Time Column 1416, a Power Loss Status Column 1418, a Satellite Blocked Status Column 1420 and an Active Column 1422. The Date/Time Column 1416 includes a Date/Time Stamp of the last message received from the corresponding machine 102, 302. The Power Loss Column 1418, the Satellite Blocked Status Column 1420, and the Active Status Column 1422 list the status of the corresponding machine 102, 302.

The Status Dialog 1400 also includes a Status History Button 1424, a Product Watch Details Button 1426 and a Closed Button 1428. Actuation of the Closed Button 1428 dismisses the Status Dialog 1400.

Figure 15:
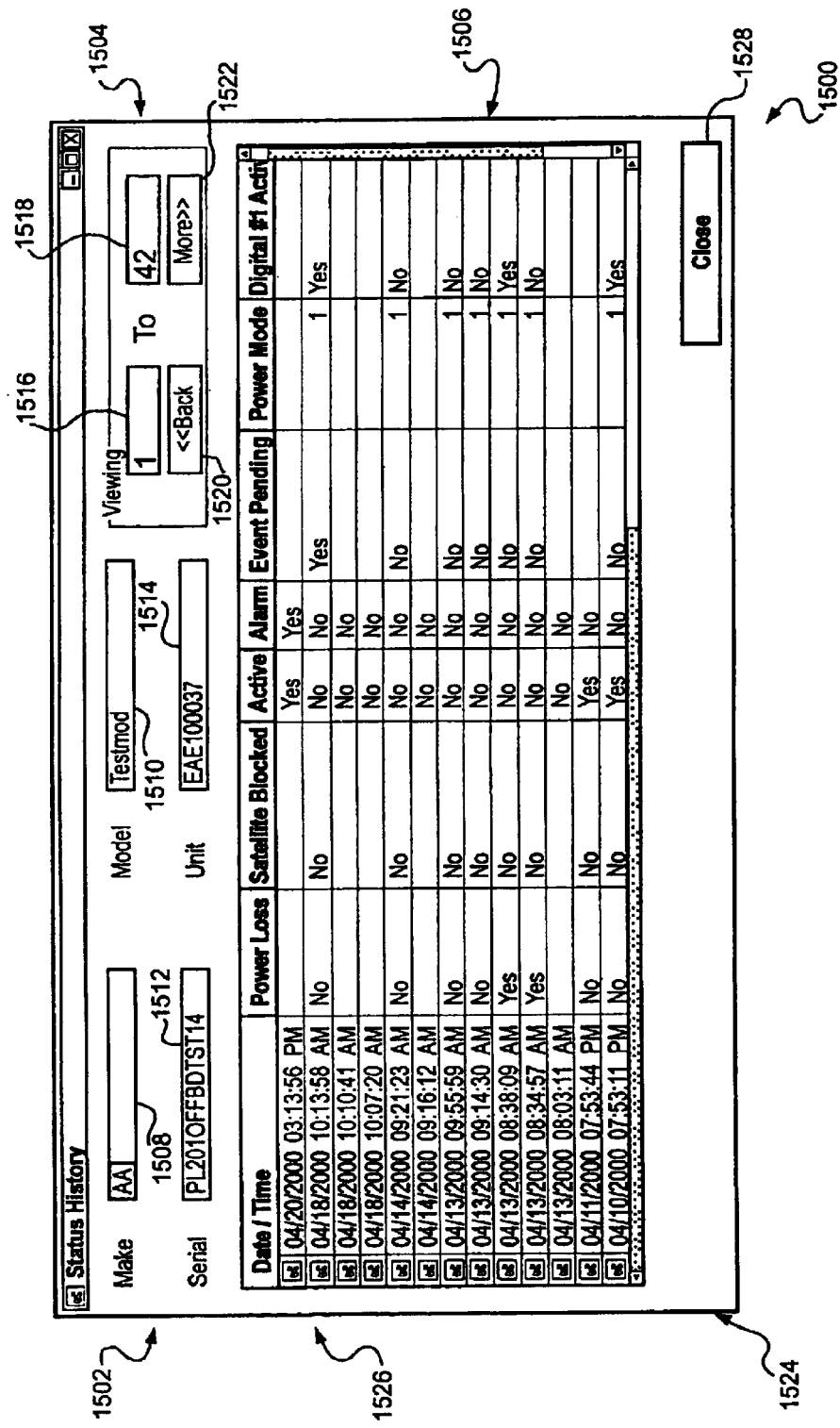
FIG. 15 is a diagrammatic illustration of a Status History Dialog, according to an embodiment of the present invention.

With reference to FIG. 15, actuation of the Status History Button, 1424 on the Status Dialog 1400 displays a Status History Dialog 1500. The Status History Dialog 1500 includes A Machine Information Section 1502 a Viewing Section 1504 and a List 1506. The Machine Information Section 1502 includes a Machine Make Text Box 1508, a Machine Model Text Box 1510, a Serial Number Text Box 1512, and a Unit Identifier Text Box 1514 The Machine Information Section 1502 is used to identify the machine for which the status history is displayed.

The Viewing Section 1504 includes a Star Message Text Box 1516 and an End Message Text Box 1518. The Star Message Text Box 1516 and the End Message Text Box 1518 display the first and last message currently displayed in the List Section 1506. The Viewing Section 1504 also includes a Back Button 1520 and a More Button 1522 for manipulating the messages displayed in the List Section 1506.

The List Section 1506 includes a plurality of rows 1524 and columns 1526. The rows 1524 display a plurality of Status History Items as shown for the corresponding machine 102, 302. The Status History Items include a plurality of machine parameters which are displayed in the columns 1526, as shown. The Status History Dialog 1500 also includes a Close Button 1528. Actuation of the close button 1528 dismisses the Status History Dialog 1500.

Figure 16:
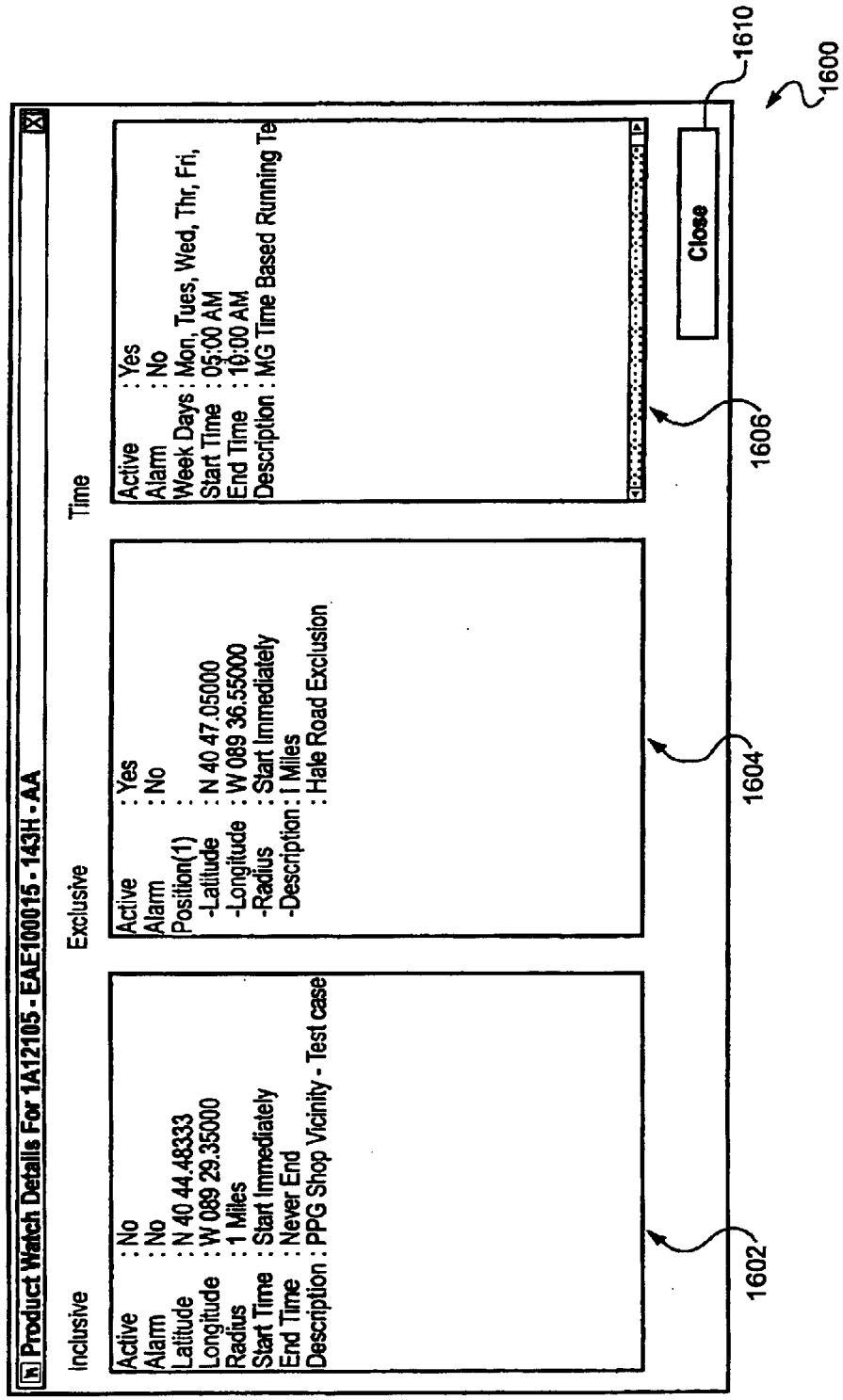
FIG. 16 is a diagrammatic illustration of a Product Watch Detail Dialog, according to an embodiment of the present invention.

With reference to FIG. 16, actuation of the Product Watch Details Button 1426 of the Status Dialog 1400, displays a Product Watch Details Dialog 1600. The Product Watch Details Dialog 1600 includes a Inclusive Section 1602, an Exclusive Section 1604, and a Time section 1606. The Product Watch Details Dialog 1600 also includes a Close Button 1610. Actuation of the Close Button 1610, dismisses the Product Watch Details Dialog 1600.

Figure 17:
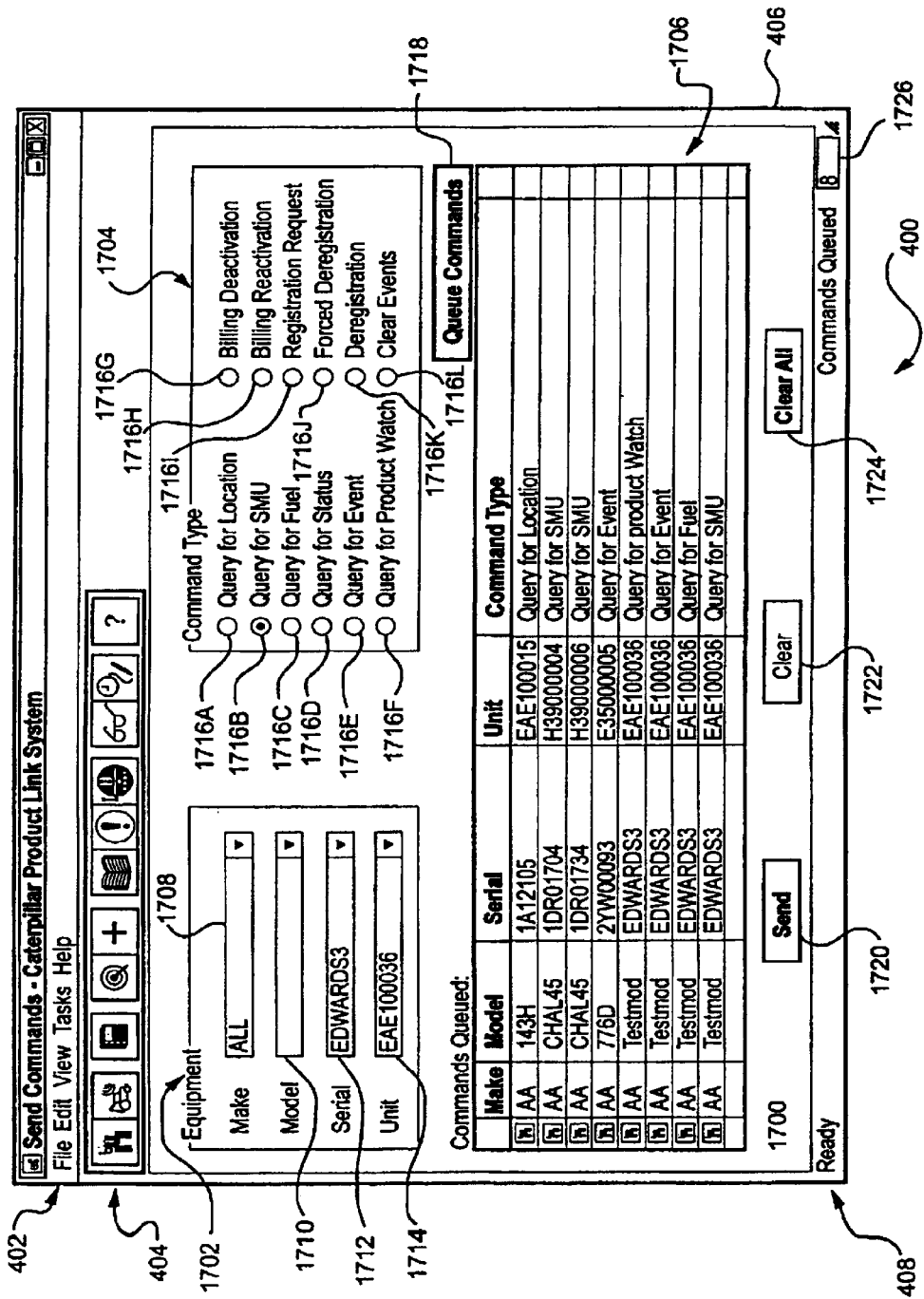
FIG. 17 is a diagrammatic illustration of a Send Commands Screen, according to an embodiment of the present invention.

With reference to FIG. 17, upon actuation of the Second Command Button 1004 on the Button Bar 404 or selection of the Send Command Item 804 on the Tasks Submenu 800, a send Commands Screen 1700 is displayed in the Product Link System Panel 406. The send command screen 1700 allows commands to be sent to an individual or a subset of machines 102, 302. The Send Command Screen 1700 includes an Equipment Information Section 1702, a Command Type Information Section 1704, and a Command Queue Section 1706.

The Equipment Information Section 1702 includes a Machine Make Dropdown List 1708, a Machine Model Dropdown List 1710 a Serial Number Dropdown List, 1712 and a Unit Identifier Dropdown List 1714.

The user 110 selects the machine model or models 102, 302 to which commands are to be sent via the Equipment Information Section 1702.

The Command Type Information Section 1704 includes a plurality of Radio Buttons 1716. As shown, the Radio Buttons include a Query For Location Radio Button 1716A, a Query For SMU Radio Button 1716B, a Query For Fuel Radio Button 1716C, a Query For Status Radio Button 1716D, a Query For Event Radio Button 1716E, a Query For Product Watch Radio Button, 1716F, a Billing Deactivation Button 1716G, a Billing Reactivation Radio Button 1716H, a Registration Request Radio Button 17161, a Forced Deregistration Radio Button 1716J, a Deregistration Radio Button 1716K and a Clear Events Radio Button 1716L. The Command Type Information Section 1704 also includes a Queue Command Button 1718.

The user 110 selects the machine or machines to send commands and the Equipment Information Section 1702 and the command type in the Command Type Information Section 1704. Then the user 110 activates the Queue Commands Button 1718 and the selected command is added to the Command Queue 1706.

The Send Command Screen 1700 also includes a Send Button, 1720, a Clear Button 1722 and a Clear All Button 1724. The Status Bar 408 includes A Command Queue Text Box 1726 which displays the total number of commands in the Command Queue 1706.

Actuation of the Send Button 1720 sends the commands in the command queue 1706 to the individual machines 102, 302 via the other data communications network 106. Actuation of the Clear Button 1722 removes a selected command from the Command Queue 1706. Actuation of the Clear All Button 1724 removes all commands in the Command Queue 1706.

Figure 18:
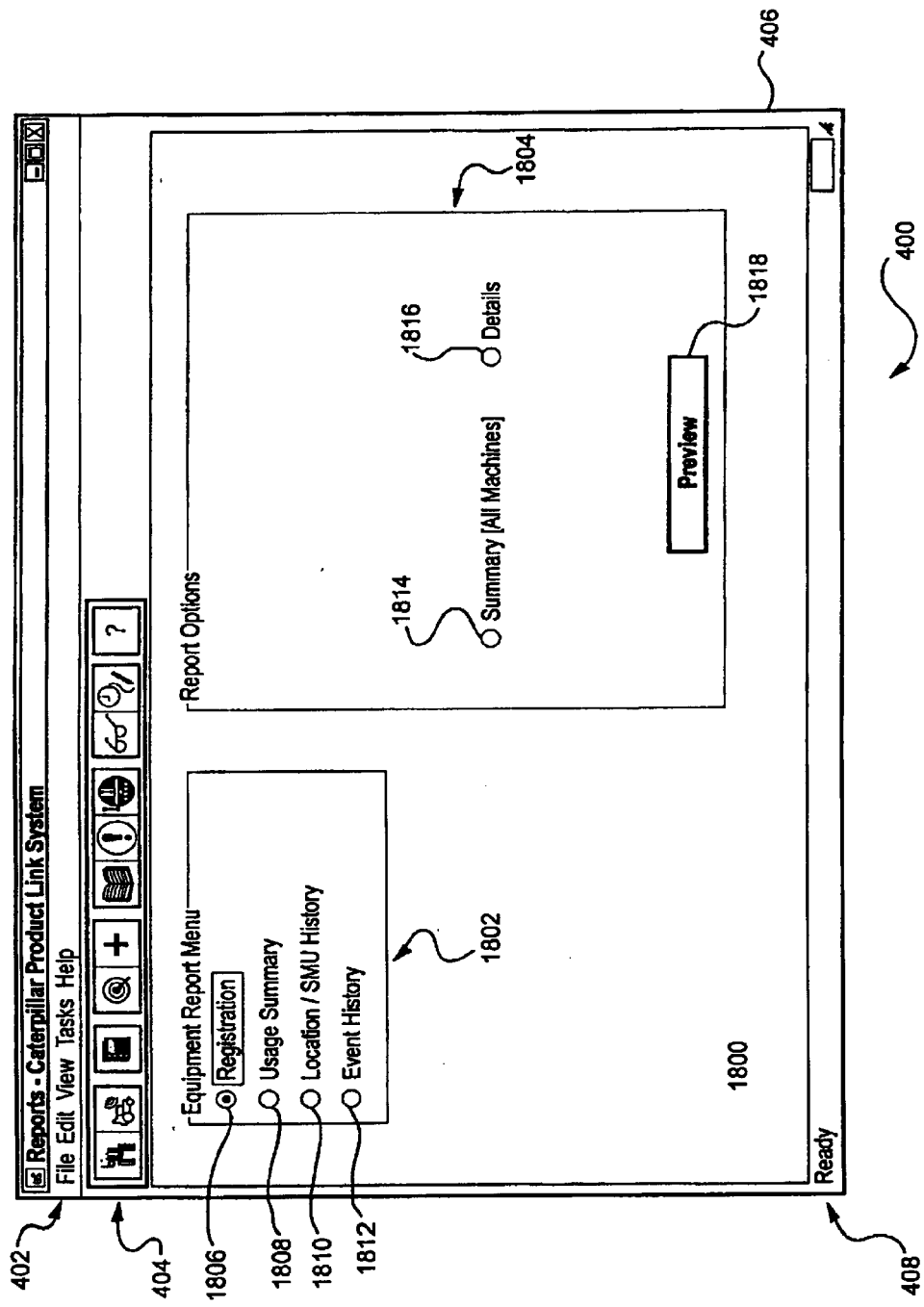
FIG. 18 is a diagrammatic illustration of a Reports Screen, according to an embodiment of the present invention.

With reference to FIG. 18, upon actuation of the Reports Button 1006 of the Tool Bar 404 or selection of the Reports Item 806 on the Tasks Submenu 800, a Reports Screen 1800 is displayed in the Product Link System Panel 406. The Reports Screen 1800 includes an Equipment Report Menu 1802 and a Report Options Section 1804.

The Equipment Report Menu 1802 includes a Registration Radio Button 1806, a Usage Summary Radio Button 1808, a Location/SMU History Radio Button 1810, and Events History Radio Button 1812. Selection of one of the Radio Buttons 1806, 1808, 1810, 1812 selects a corresponding report type. For the selected report type, the corresponding report options are displayed in the report options section 1804.

The default report type is Registration. With the Registration Radio Button 1806 selected, the Report Options Section 1804 includes a Summary Radio Box 1814 and a Details Radio Box 1816. The Report Options Section 1804 includes a Preview Button 1818.

Actuation of the Preview Button 1818 displays a preview of the report. If the Summary Radio Button 1814 is selected, then all machines in the fleet are included in the report.

Figure 19:
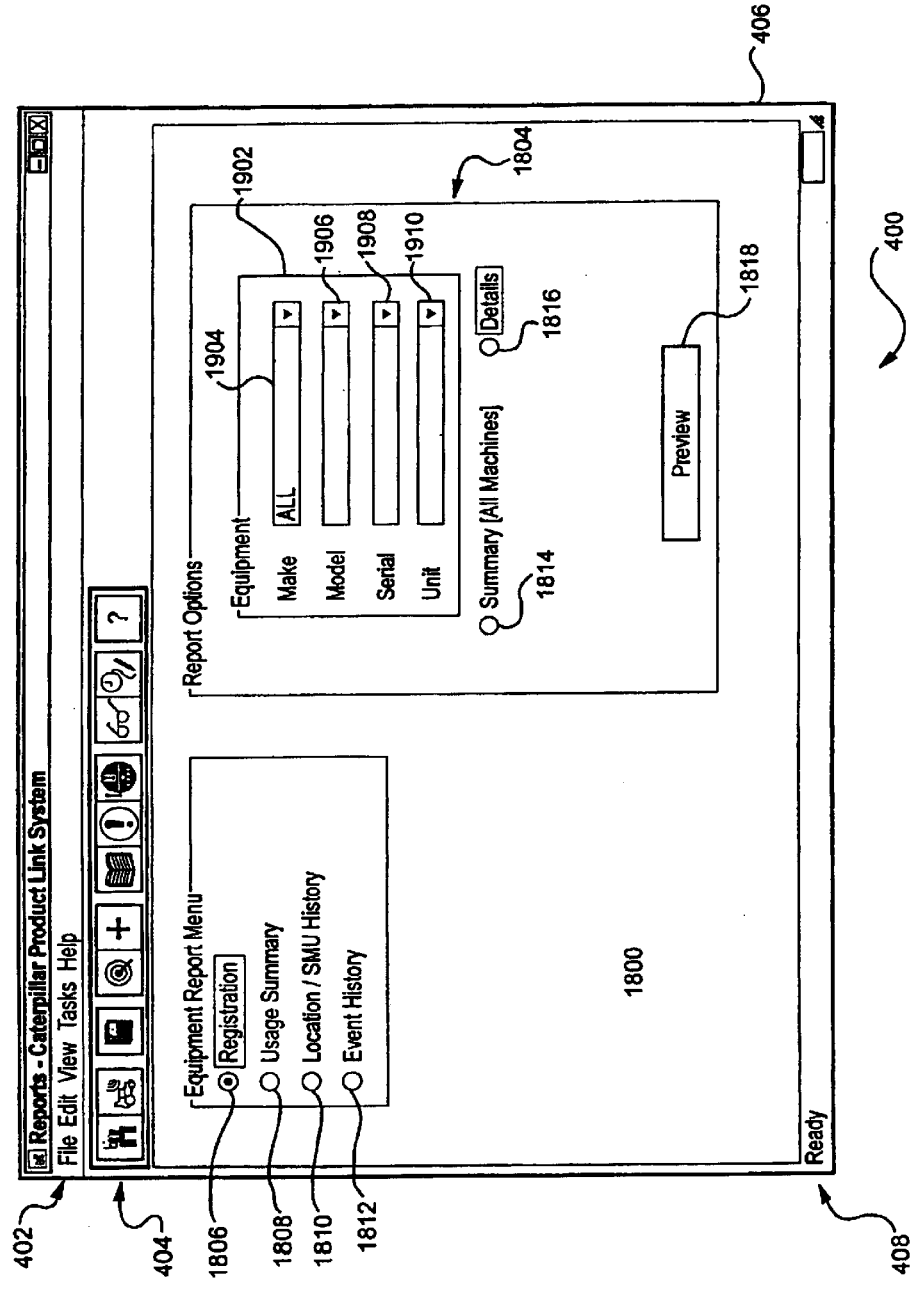
FIG. 19 is a diagrammatic illustration of a Reports Screen showing a details option, according to an embodiment of the present invention.

With reference to FIG. 19, if the Details Radio box 1816 is selected, then the Report Options Section 1804 includes an Equipment Information Section 1902. The Equipment Information Section 1902 includes a Machine Make Dropdown List 1904, a Machine Model Dropdown List 1906, a Serial Number Dropdown List 1908, and a Unit Identifier Dropdown List 1910. The user 110 may manipulate the Dropdown Lists 1904, 1906, 1908, 1910 to identify which machines 102, 302 to be included in the report.

Figure 20:
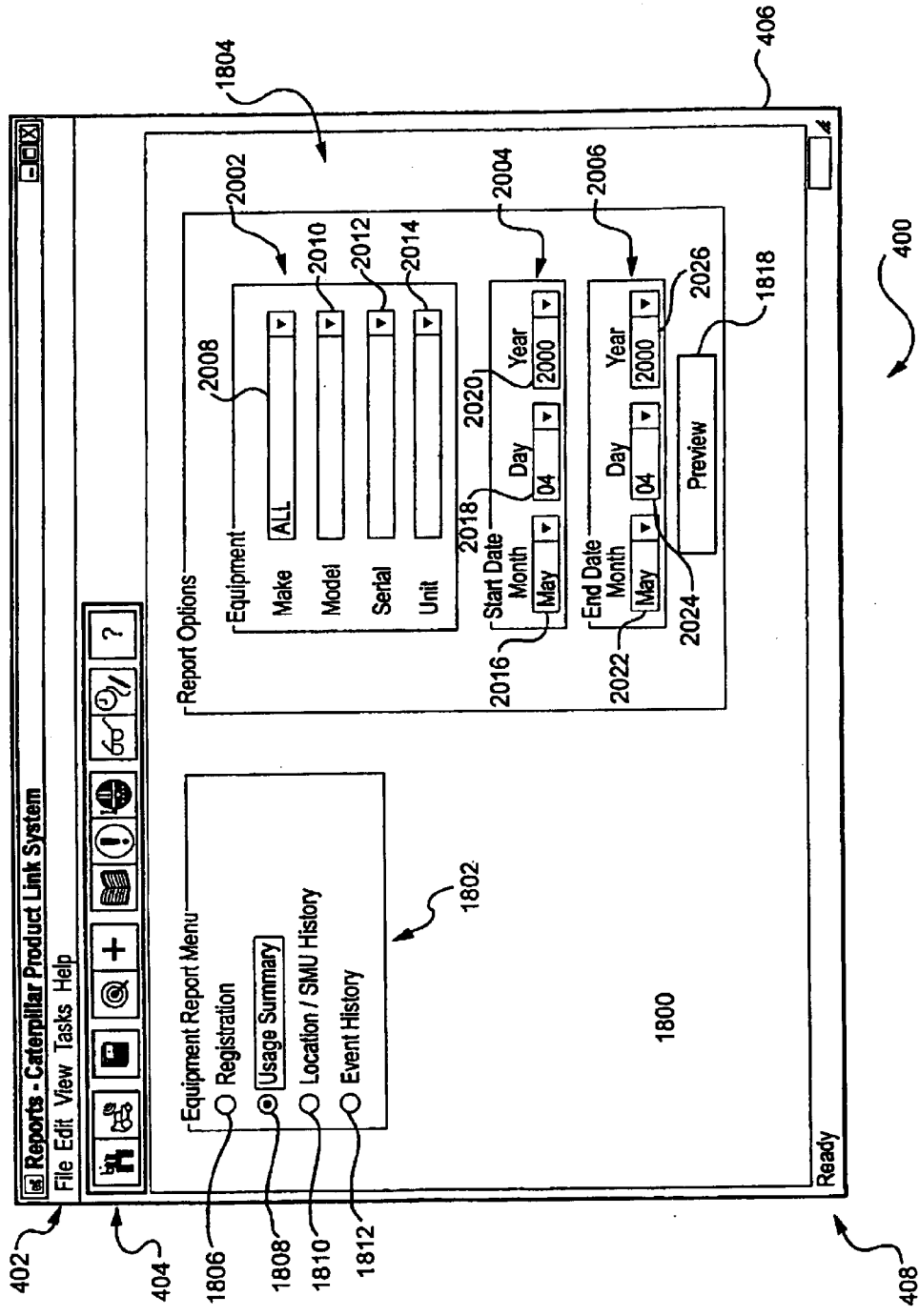
FIG. 20 is a diagrammatic illustration of a Reports Screen showing usage summary, according to an embodiment of the present invention.

With reference to FIG. 20, if the Usage Summary Radio Button 1808 is selected in the Equipment Report Menu 1802, then the Report Options Section 1804 includes an Equipment Information Section 2002, a Start Date Section 2004, and an End Date Section 2006. The Equipment Information Section 2002 includes a Machine Make Dropdown List 2008, a Machine Model Dropdown List 2010, a Serial Number Dropdown List 2012, and a Unit Identifier Dropdown List 2014. The user 110 selects the machines 102, 302 to be included in the report by manipulation of the Dropdown Lists 2008, 2010, 2012, 2014. The Start date Section 2004 includes a Month Dropdown List 2016, a Day Dropdown List 2018 and a Year Dropdown List 2020. The End Date Section 2006 includes a Month Dropdown List 2022, a Day Dropdown List 2024, and a Year Dropdown List 2026. The user 110 may manipulate the start and end date of entries to be included in the report by manipulation of the Dropdown Lists 2016, 2018, 2020, 2022, 2024, 2026.

Figure 21:
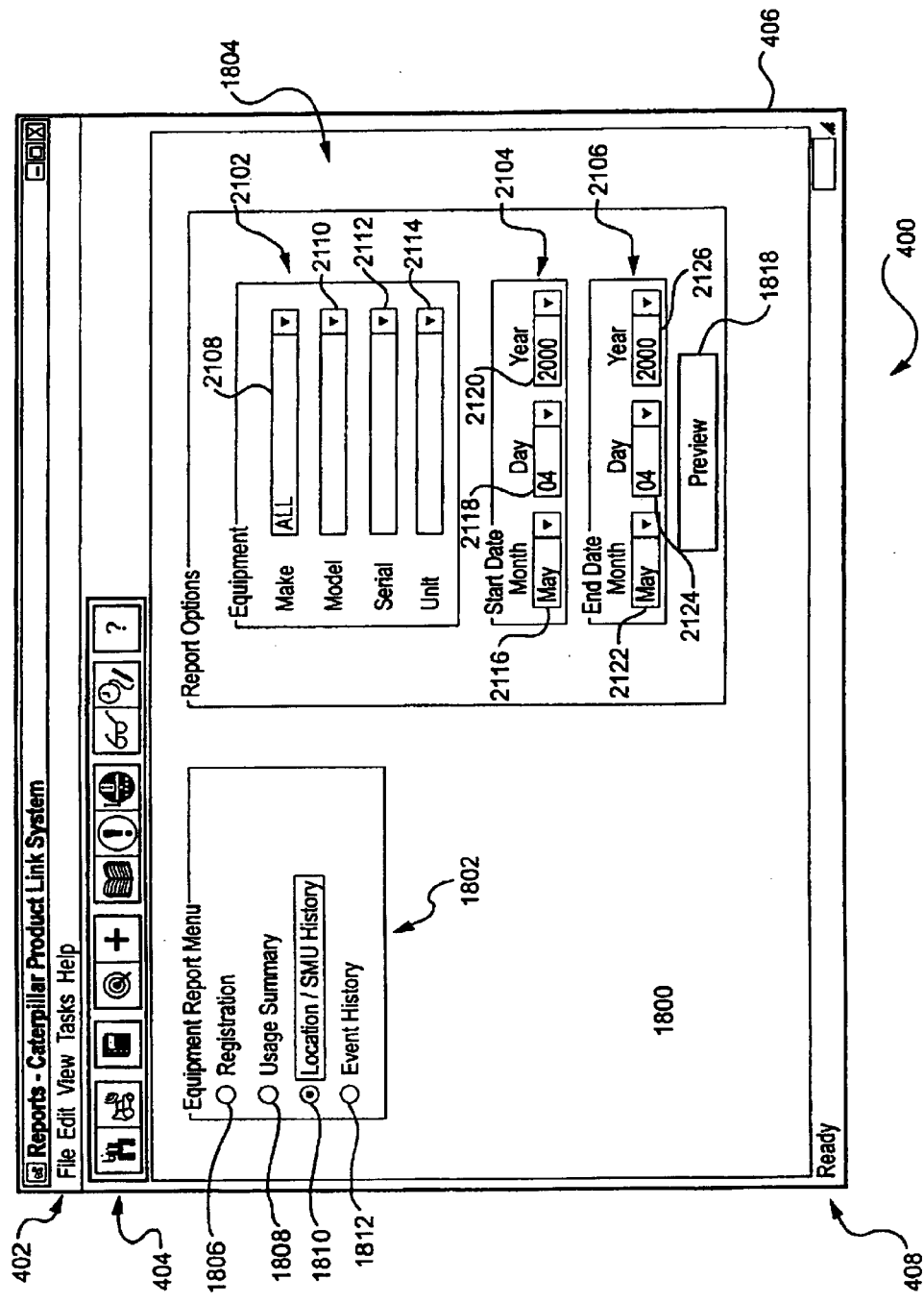
FIG. 21 is a diagrammatic illustration of a Reports Screen showing location/SMU history, according to an embodiment of the present invention.

With reference to FIG. 21, if the Location/SMU History Radio Button 1810 is selected in the Equipment Report Menu 1802 then the Report Options Section 1804 includes an Equipment Information Section 2102, a Start Date Section 2104 and an End Date Section 2106. The Equipment Information Section 2102 includes a Machine Make Dropdown List 2108 a Machine Model Dropdown List 2110, a Serial Number Dropdown List 2112 and a Unit Identifier Dropdown List 2114. The user 110 may manipulate the machines 102, 302 to be included in the report by manipulation of the Dropdown List 2108, 2110, 2112, 2114. The Start Date Section 2104 includes a Month Dropdown List 2116, a Day Dropdown List 2118, and a Year Dropdown List 2120. The End Date Section 2106 includes a Month Dropdown List 2122, a Day Dropdown List 2124 and a Year Dropdown List 2126. The user 110 may manipulate the Start and End Date of entries to be included in the report by manipulation of the Dropdown Lists 2116,2118,2120,2122, 2124,2126.

Figure 22:
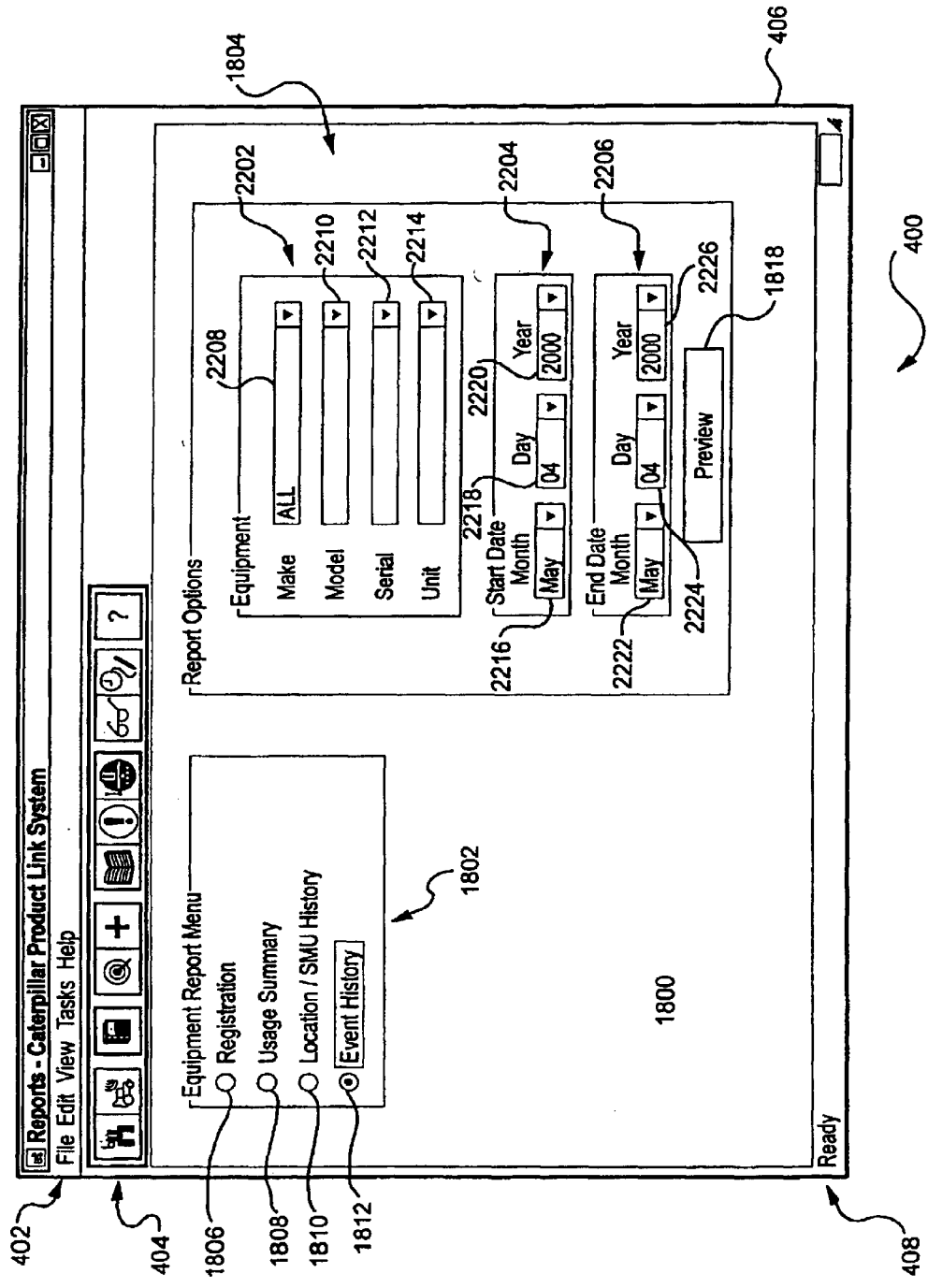
FIG. 22 is a diagrammatic illustration of a Reports Screen showing events history, according to an embodiment of the present invention.

With reference to FIG. 22, if the Event History Button 1812 is selected in the Equipment Report Menu 1802, then the Report Options Section 1804 includes an Equipment Information Section 2202, a Start Date Section 2204 and an End Date Section 2206. The Equipment Information Section 2202 includes a Machine Make Dropdown List 2208, a Machine Model Dropdown List 2210, a Serial Number Dropdown List 2212, and a Unit Identifier Dropdown List 2214. The user 110 may manipulate the machines 102, 302 to be included in the report by manipulation of the Dropdown List 2208, 2210, 2212, 2214. The Start Date Section 2204 includes a Month Dropdown List 2216, a Day Dropdown List 2218 and a Year Dropdown List 2220. The End Date Section 2206 includes a Month Dropdown List 2222, a Day Dropdown List 2224, and a Year Dropdown List 2226. The user 110 may manipulate the start and end date of entries to be included in the report by manipulation of the Dropdown List 2216, 2218, 2220, 2222, 2224, 2226.

In the preferred embodiment the software program entitled Crystal Reports® is used to generate and preview the reports. Crystal Reports® is a commercially available software product available from Seagate Software®.

Figure 23:
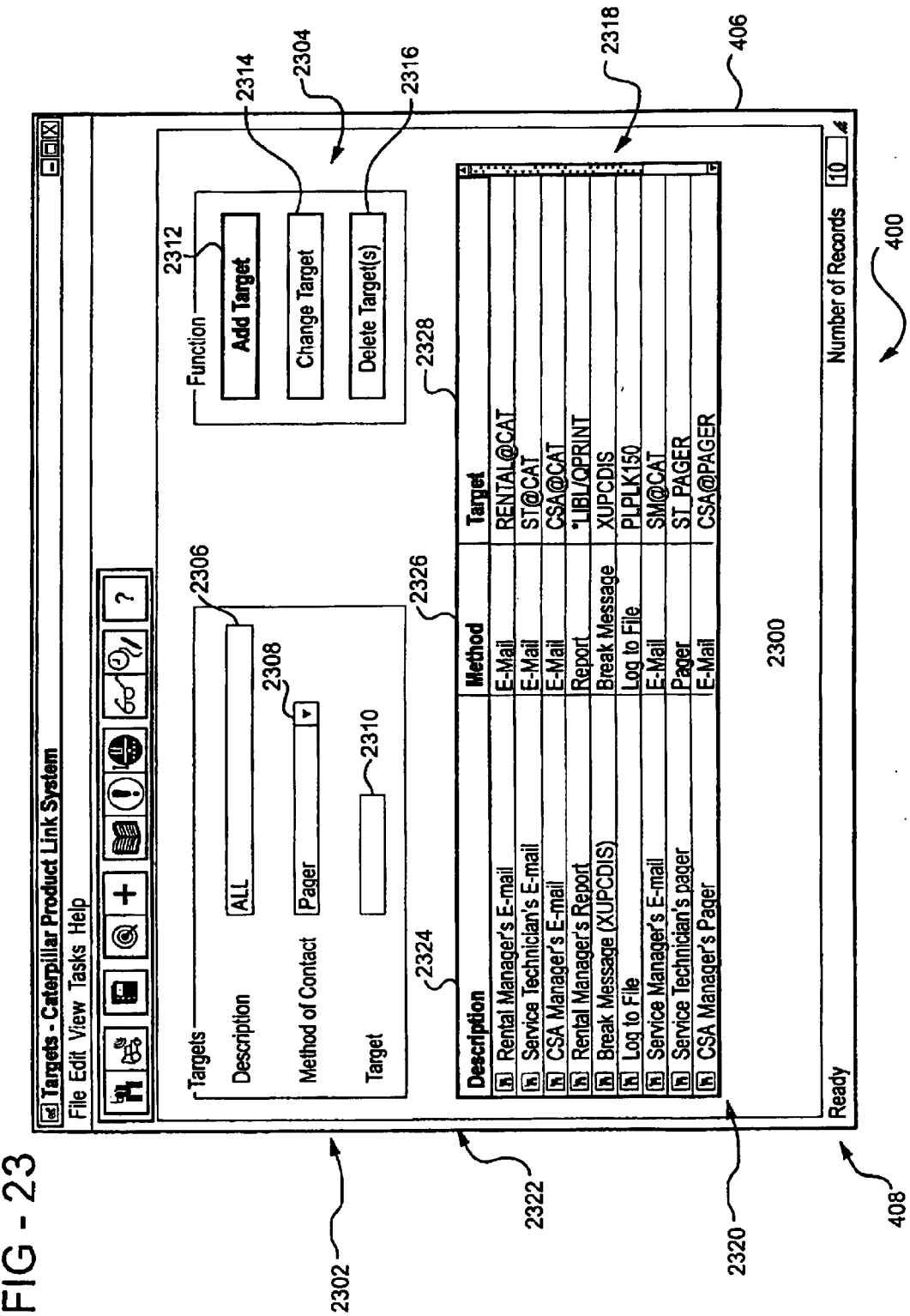
FIG. 23 is a diagrammatic illustration of a Targets Screen, according to an embodiment of the present invention.

With reference to FIG. 23, upon actuation of the Targets Button 1008 on the Button Bar 404 or selection of the Working With Targets Item 808 on the task submenu 800, a Targets Screen 2300 is displayed in the Product Links System Panel 406. The Targets Screen 2300 includes a Targets Information Section 2302 and a Function Section 2304. The Target Information Section 2302 includes a Description Textbox 2306, a Method of Contact Dropdown List 2308 and a Target Textbox 2310. The Target Function Section 2304 includes an Add Target Button 2312, a Change Target Button 2314, and a Delete Target Button 2316.

A target is defined as a contact for communications and the method for communicating to that target. The target screen 2300 also includes a Target List 2318 having a plurality of rows and column 2320, 2322. The available targets are listed in the rows 2320 and target parameters are shown in the columns 2322. For example, in the preferred embodiment, the targets include a Description Field 2324, a Method Of Communication Field 2326 and a Target Field 2328.

Actuation by the user 110 of the Add Target Button 2312 displays a dialog (not shown), for entering data related to a new target.

Actuation of the Change Target Button 2314 displays a dialog (not shown), for changing information related to a selected target.

Actuation of the Delete Target Button 2316, displays a Confirmation Dialog (not shown), to confirm deletion of a selected target item.

Figure 24:
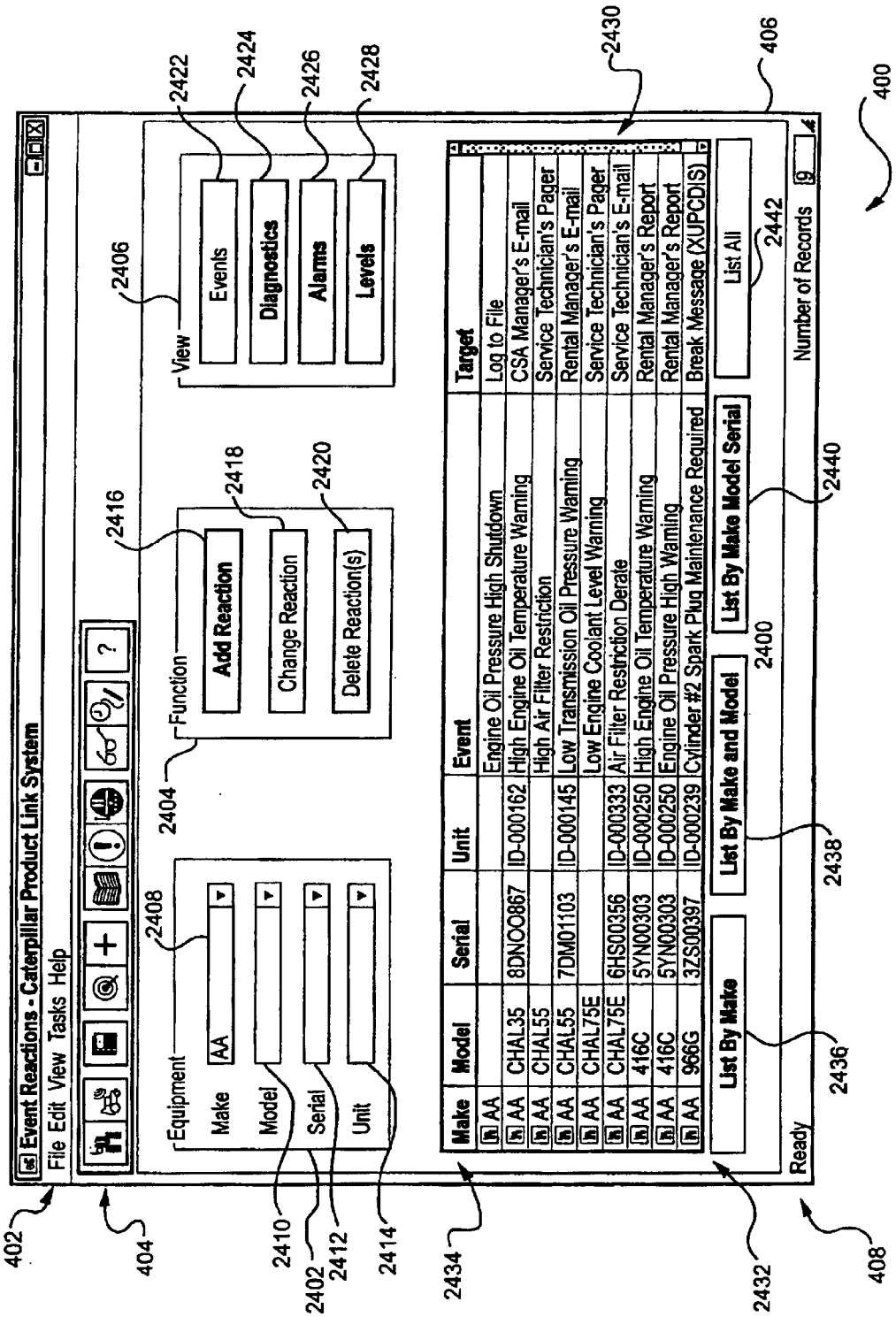
FIG. 24 is a diagrammatic illustration of an Event Reactions Screen, according to an embodiment of the present invention.

With reference to FIG. 24, upon actuation of the Reactions Button 1010 or selection of the Working With Event Reactions Item 810 from the task submenu 800, an Event Reactions Dialog 2400 is displayed in the Product Link System Panel 406. The Event Reactions Screen 2400 includes an Equipment Information Section 2402, a Function Section 2404, and a View Section 2406. The Equipment Information Section 2402 includes a Machine Make Dropdown List 2408, a Model Dropdown List 2410, a Serial Number Dropdown List 2412, and a Unit Identifier Dropdown List 2414. The Function Information Section 2404 includes an Add Reaction Button 2416, a Change Reaction Button 2418, and a Delete Reaction Button 2420. The View Information Section 2406 includes an Events Button 2422, a Diagnostics Button 2424, an Alarms Button 2426, and a Levels Button 2428. The Event Reactions Screen 2400 allows the user 110 to select the response to receipt from the machines 102, 302 to specified events, i.e., events diagnostics, alarms and/or levels. The Event Reaction Screen 2400 also includes a List of Event Reactions 2430 having a plurality of rows 2432 and columns 2434.

Actuation of the Buttons 2422, 2424, 2426, 2428 in the View Information Section 2406 specifies which type of events are displayed in the list 2430.

In the preferred embodiment as shown, the following information is displayed in columns 2434: machine make, machine model, machine serial number, machine unit identifier, event, and target. The target identifies the response to the identified event, for example, as shown in the first row if the shut down was performed because of high engine oil pressure then the event is logged to a file. Other targets may include email and/or pagers.

Actuation of the Add Reaction Button 2416 displays an Add Reaction Dialog (not shown) for adding reactions to the list. Actuation of the Change Reaction Button 2418, displays a Change Reaction dialog (not shown) for changing a selected reaction. Actuation of the Delete Reactions Button 2420 deletes a selected reaction from the List 2430.

The user 110 controls the machines 102, 302 for which events are displayed in the list 2430 by manipulation of the Dropdown Lists 2408, 2410, 2412, 2414. The Event Reactions Screen 2400 also includes a List By Make Button 2436, a List By Make and Model Button 2438, a List By Make, Model and Serial Number Button 2440 and a List All Button 2442. Actuation of the Buttons 2436, 2438, 2440, 2442 changes the order in which reactions are displayed in the list 2430.

Figure 25:
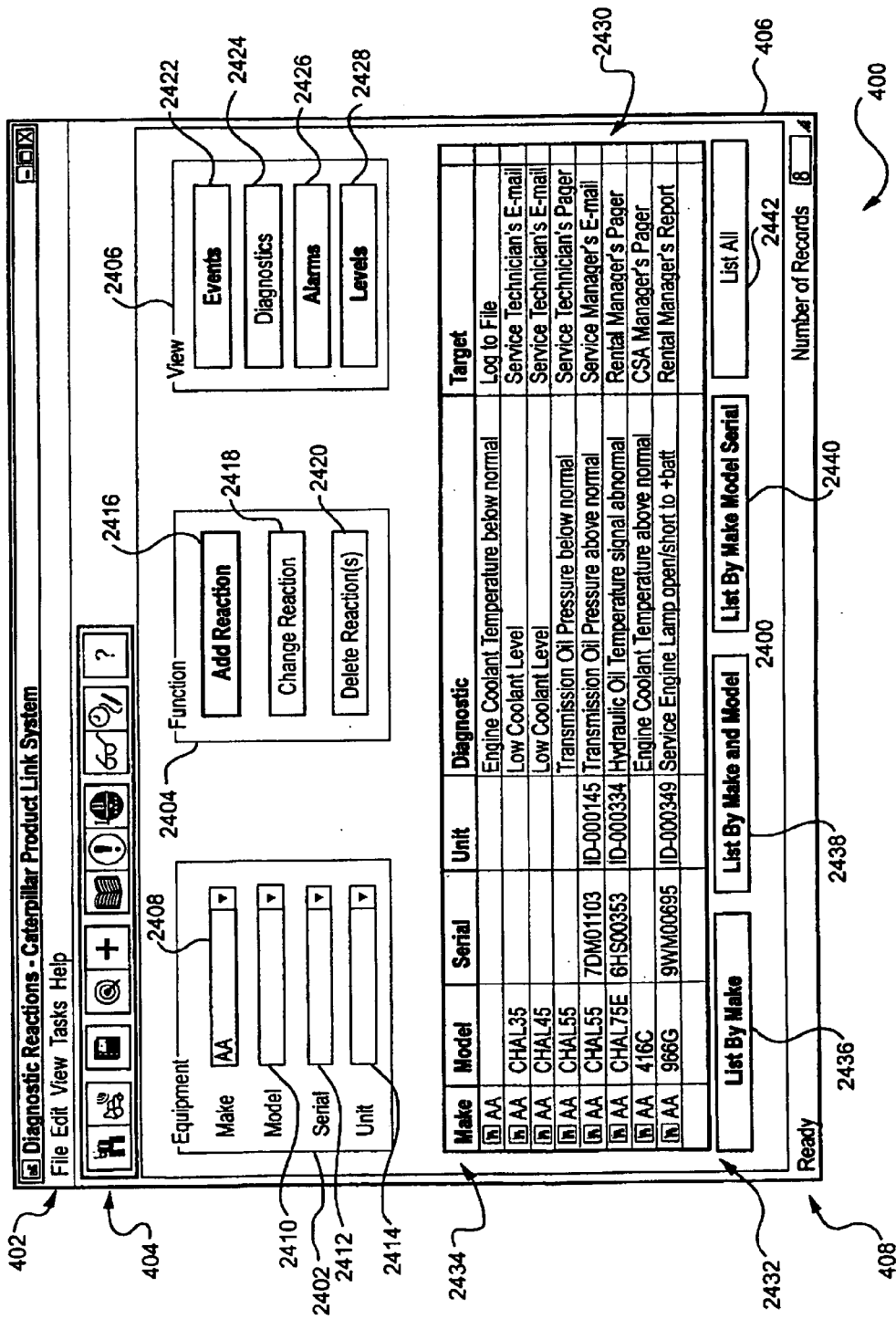
FIG. 25 is a diagrammatic illustration of a Diagnostic Reactions Screen, according to an embodiment of the present invention.

With reference to FIG. 25, upon actuation of the Diagnostics Button 2424, the List 2430 includes a list of reactions to diagnostic codes.

Figure 26:
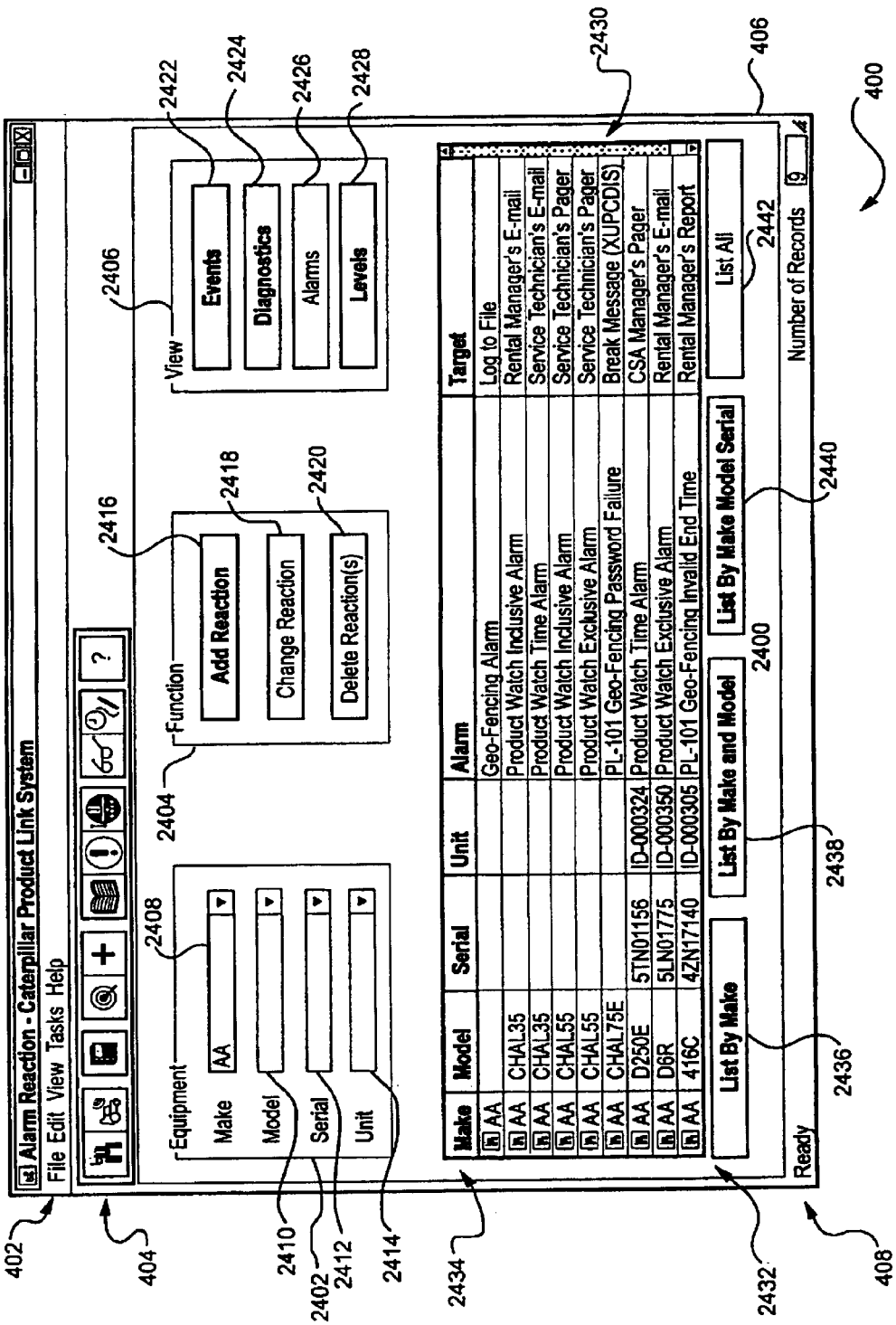
FIG. 26 is a diagrammatic illustration of an Alarm Reactions Screen, according to an embodiment of the present invention.

With reference to FIG. 26, upon actuation of the Alarm Button 2426 by the user 110 the list 2430 displays a list of reaction to alarms received by the machines 102, 302.

Figure 27:
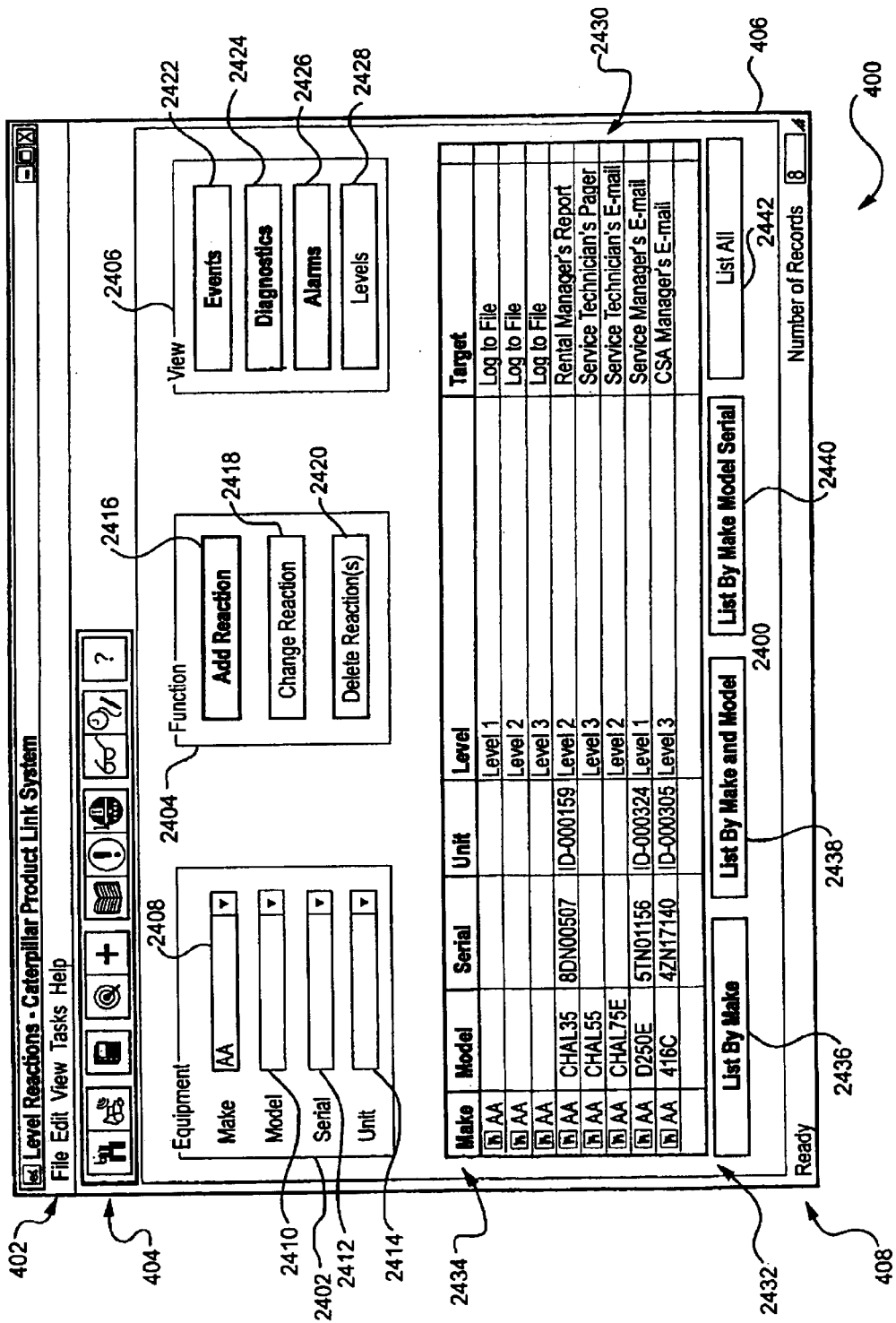
FIG. 27 is a diagrammatic illustration of a Level Reactions Screen, according to an embodiment of the present invention.

With reference to FIG. 27, upon actuation of the Levels Button 2428, a list of reactions to level events is displayed in the list 2430.

Figure 28:
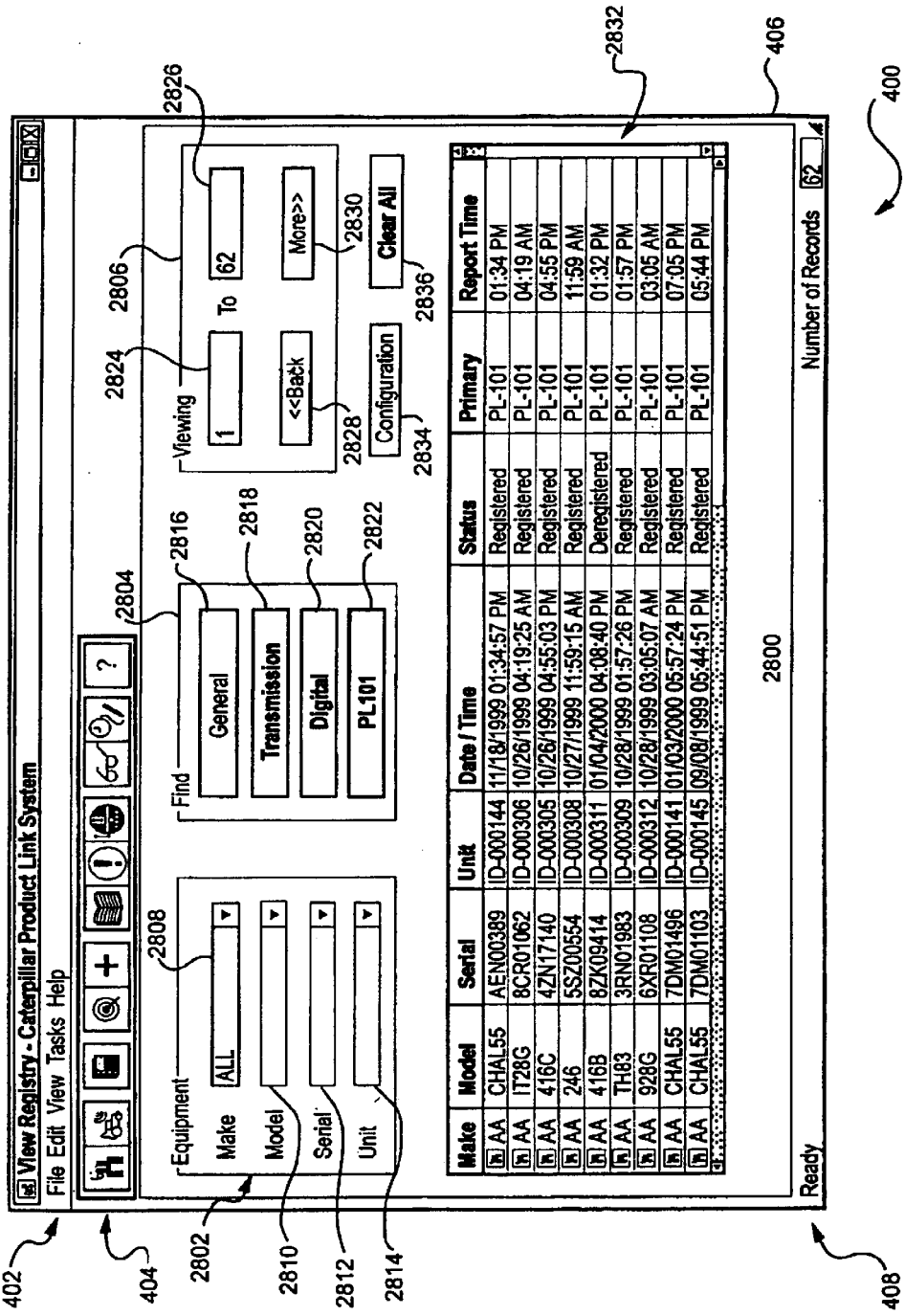
FIG. 28 is a diagrammatic illustration of a View History Screen, according to an embodiment of the present invention.

With reference to FIG. 28, upon actuation of the View Registry Button 1012 in the Button Bar 404 or selection of the View Registry Item 706 a View Registry Screen 2800 is displayed in the Product Link System Panel 406. The View Registry Screen 2800 is used to display the registration status of selected machines 102, 302. The View Registry Screen 2800 includes an Equipment Information Section 2802, a Find Section 2804, and a Viewing Section 2806.

The Equipment Information Section 2802 includes a Machine Make Dropdown List 2808, a Machine Model Dropdown List 2810, a Serial Number Dropdown List 2812, and a Unit Identifier Dropdown List 2814. The user 110 may select a single machine or subset of the machines in the fleet 102, 302 by using the Dropdown Lists 2808, 2810, 2812, 2814.

The Find Section 2804 includes a General Button 2816, a Transmission Button 2818, a Digital Button 2820 and a PL101 Button 2822. The Viewing Section 2806 includes a Start Box 2824 and an End Box 2826, a Back Button 2828 and a More Button 2830. The View Registry Screen 2800 also includes a list 2832. The Viewing Section 2806 controls the items listed in the list 2832.

The Buttons 2816, 2818, 2820, 2822 in the Find Section 2804 control the type of information that is listed in the List 2832. For example, upon actuation of the General Button 2816, the machines which fit that criteria chosen by the user 110 in the Equipment Information Section 2802 are shown with their registered or deregistered status in the List 2832.

The View Registry Screen 2800 also includes a Configuration Button 2834 and a Clear All Button 2836. Upon actuation of the Configuration Button 2834, a Configuration Dialog (not shown) is displayed for selecting the parameters which are communicated over the data link 106.

Actuation of the Clear All Button 2836 removes all items from the List 2832.

Figure 29:
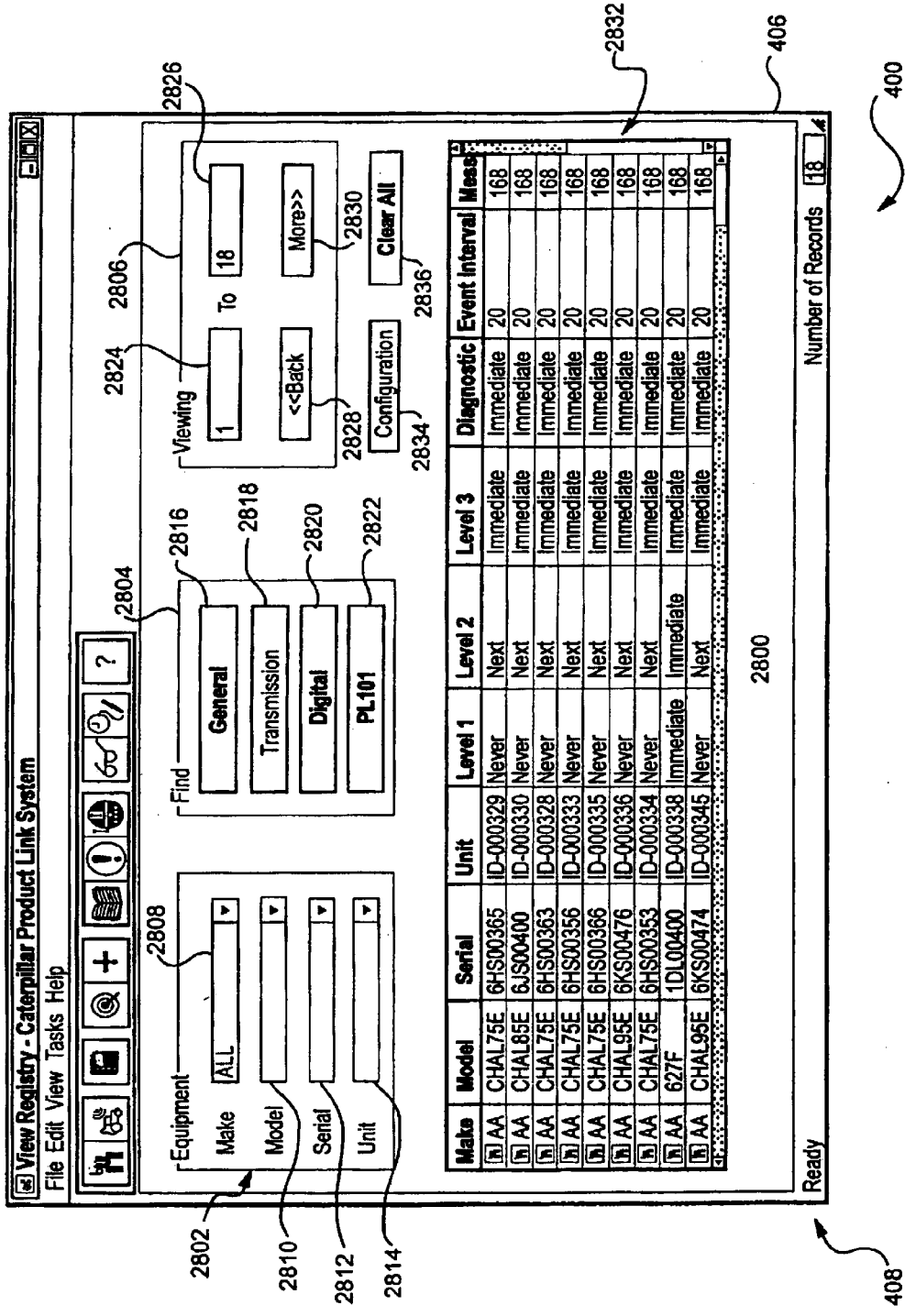
FIG. 29 is a diagrammatic illustration of a View History Screen showing transmission information, according to an embodiment of the present invention.

With reference to FIG. 29, upon actuation of the Transmission Button 2818, the List 2832 includes information related to the transmission of messages from the machine selected in the Equipment Information Section 2802.

Figure 30:
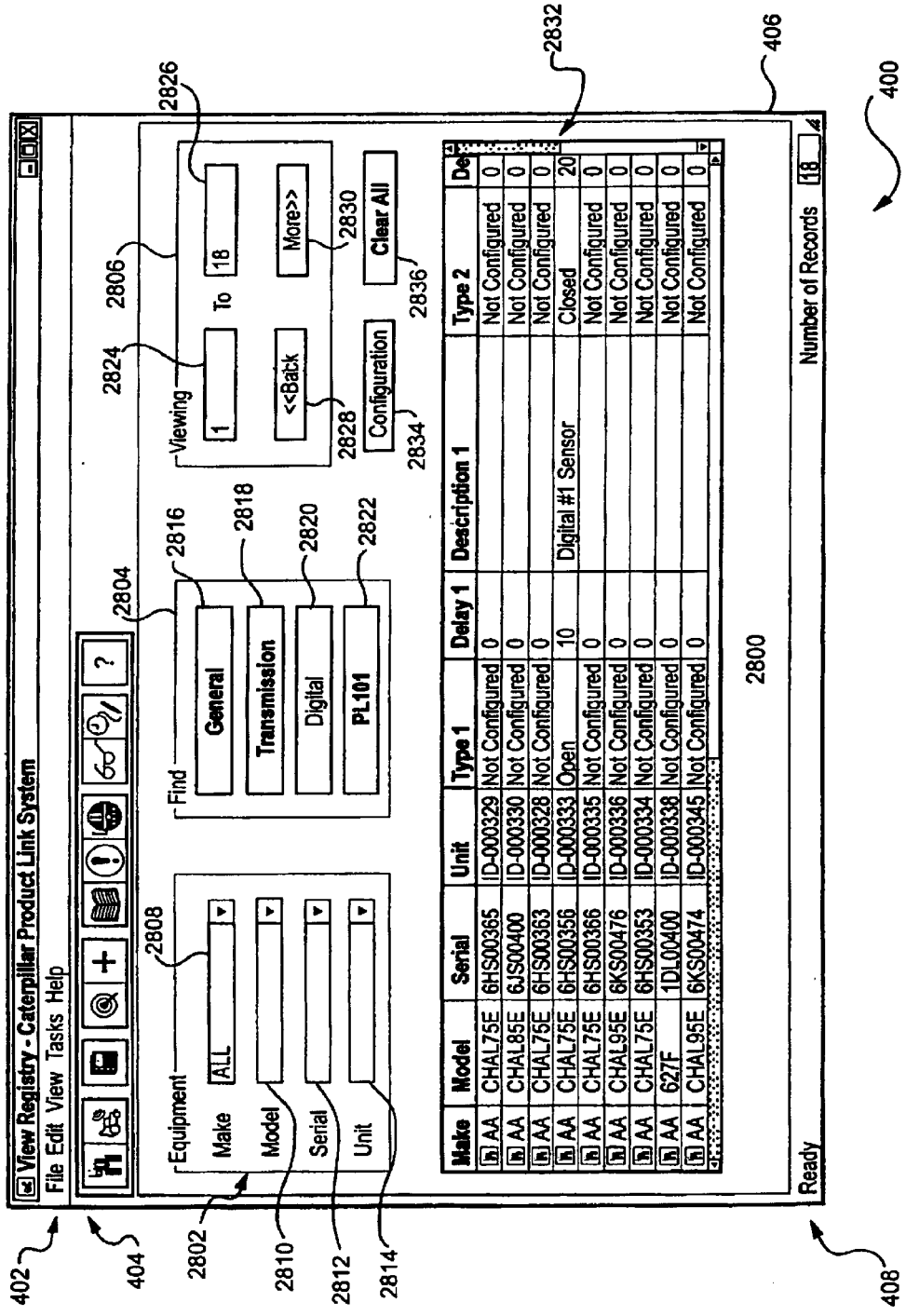
FIG. 30 is a diagrammatic illustration of a View History Screen showing digital information, according to an embodiment of the present invention.

With reference to FIG. 30, upon actuation of the digital button 2820 a list of digital information for the machine selected in the Equipment Information Section 2802 is displayed in the List 2832.

Figure 31:
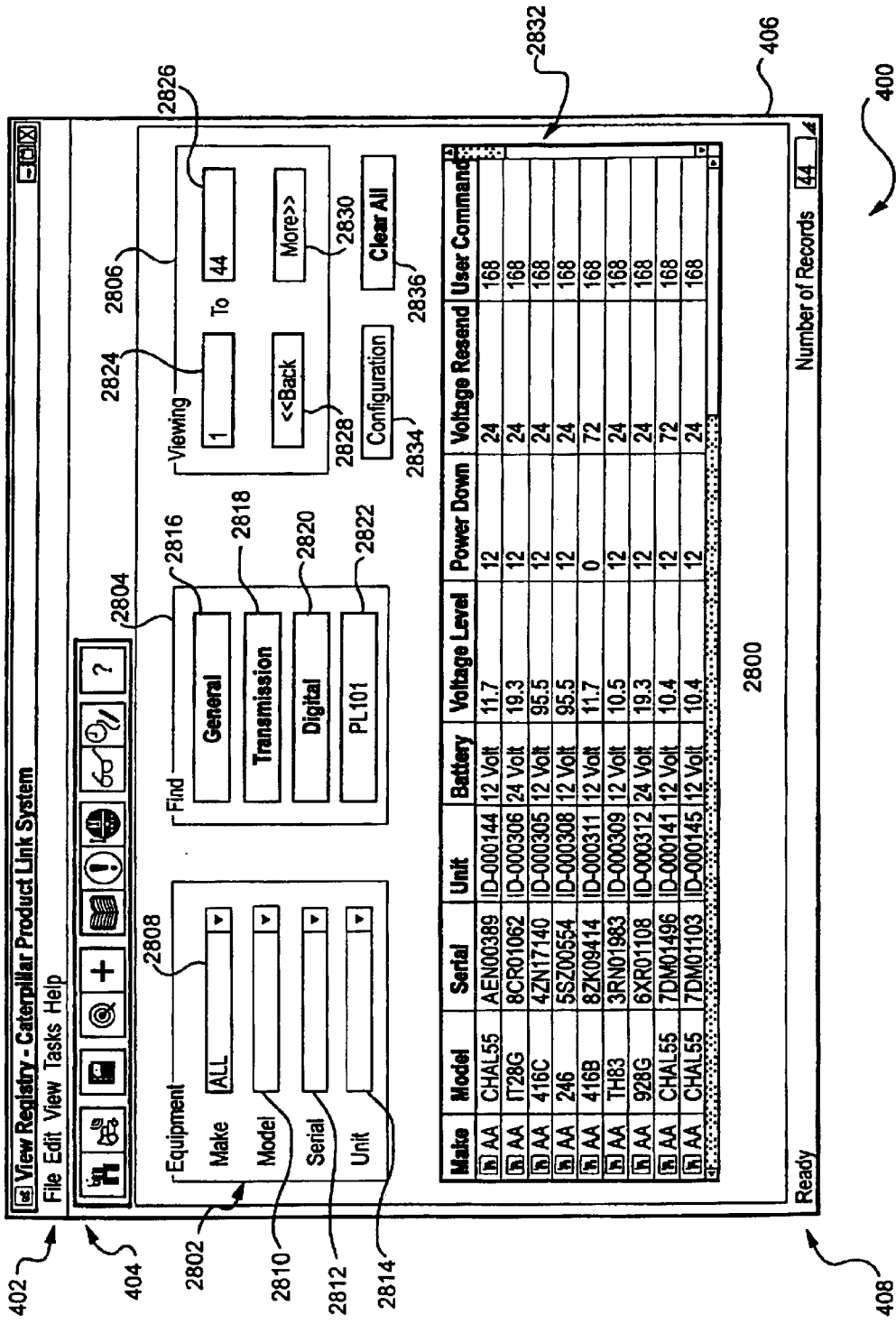
FIG. 31 is a diagrammatic illustration of a View History Screen showing software version specific information, according to an embodiment of the present invention.

With reference to FIG. 31, upon actuation of the PL101 Button 2822, information related to the machine selected in the Equipment Information Section 2802 specific to the version of the software is displayed in List 2832.

Figure 32:
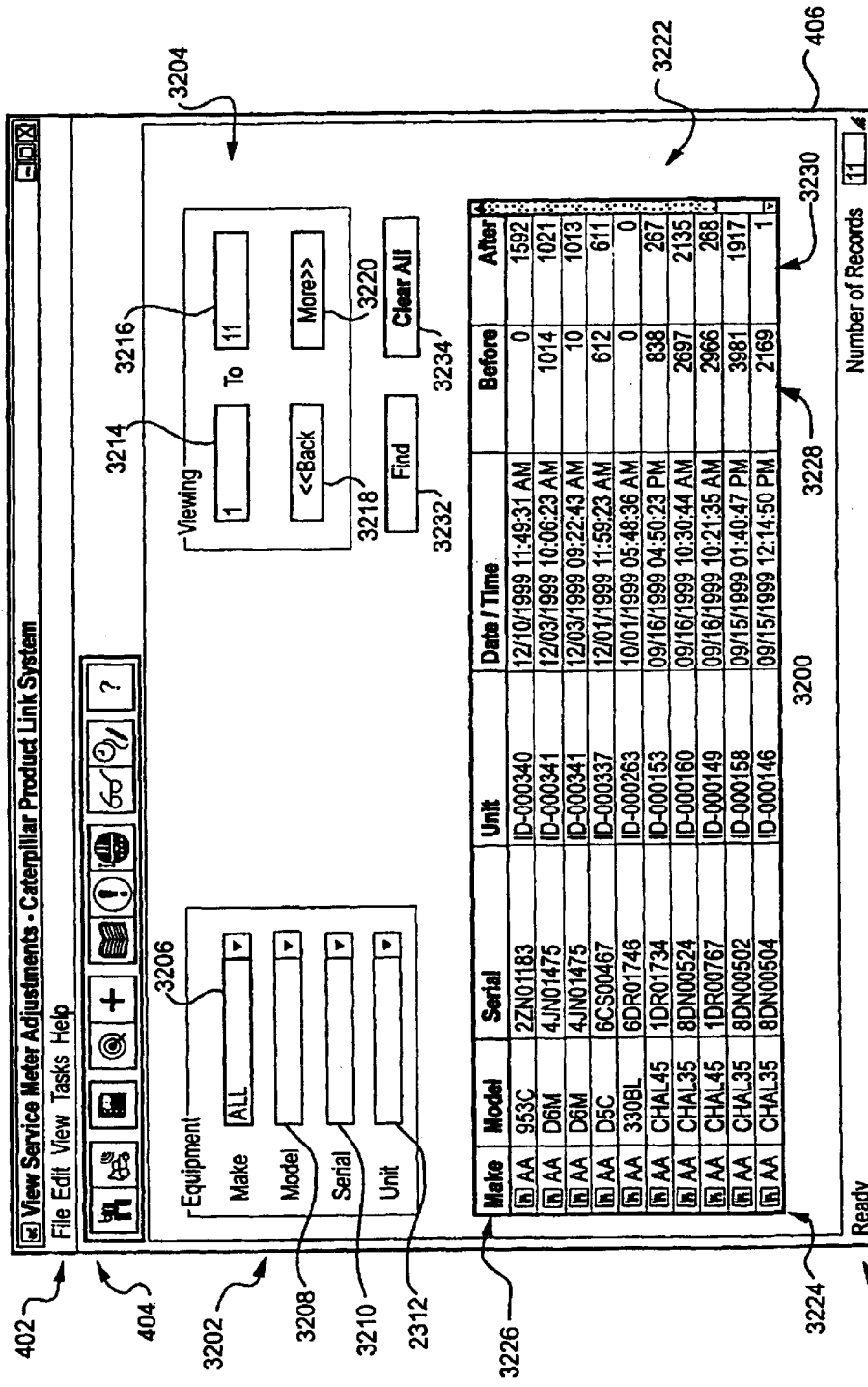
FIG. 32 is a diagrammatic illustration of a Service Meter Adjustments Screen, according to an embodiment of the present invention.

With reference to FIG. 32, upon actuation of the Service Meter Adjustments Button 1016 in the Button Bar 404 or selection of the View Service Meter adjustments item 710 in the view Tool Bar 700, a View Service Meter Adjustment Screen 3200 is displayed in the Product Link System Panel 406. The View Service Meter Adjustment Screen 3200 includes an Equipment Information Section 3202 and a Viewing Section 3204. The Equipment Information Section 3202 includes a Machine Make Dropdown List 3206, A Machine Model Dropdown List 3208, a Machine Serial Number Dropdown List 3210, and a Machine Unit Identifier Dropdown List 3212. The Viewing Section 3204 includes a Start Item Textbox 3214 and an End Item Text Box 3216. The Viewing Section 3204 also includes a Back Button 3218 and a More Button 3220. The Viewing Section 3204 controls the items listed in a List 3222. The user 110 selects a machine or machines using the Dropdown Lists 3206, 3208, 3210, 3212 in the Equipment Information Section 3202. The List 3222 includes a plurality of rows 3224 and columns 3226. The machines meeting the criteria set in the Equipment Information Section 3202 are listed in the rows 3224. A plurality of machine parameters are specified in the columns 3226 including a Service Meter Hour Before Value 3228 and a Service Meter After Hours Value 3230. The View Service Meter Adjustment Screen 3200 also includes a Find Button 3232 and a Clear All Button 3234. Actuation of the Find Button 3232 displays the machines in the List 3222 which meet the criteria set in the Equipment Information Section 3202. Actuation of the Clear All Button 3234 clears all the items in the List 3222.

Figure 33:
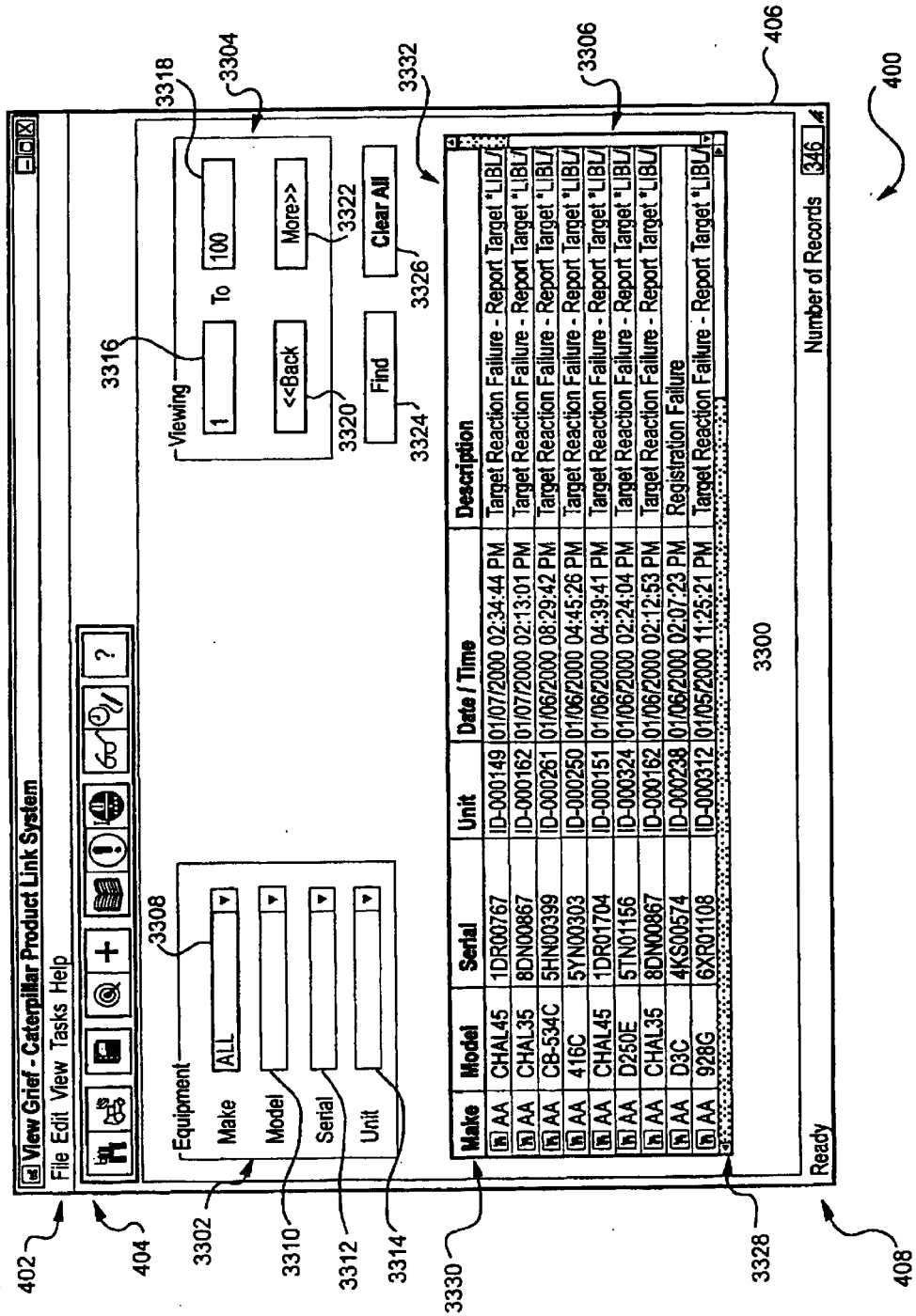
FIG. 33 is a diagrammatic illustration of a View Grief Screen, according to an embodiment of the present invention.

With reference to FIG. 33, upon actuation of the Grief Button 1014 or selection of the View Grief Item 708 from the view menu submenu 700, a View Grief Screen 3300 is displayed in the Product Link System Panel 406. The View Grief Screen 3300 includes an Equipment Information Section 3302 and a Viewing Section 3304. The View Grief Information Screen displays a List 3306 of grief reports for the selected machines. The Equipment Information Section 3302 includes a Machine Make Dropdown List 3308, a Machine Model Dropdown List 3310, a Serial Number Dropdown List 3312 and a Unit Identifier Dropdown List 3314. The user 110 selects a machine or machines 102, 302 using the Dropdown Lists 3308, 3310, 3312, 3314. The Viewing Section 3304 includes a First Element Textbox 3316 and a Last Element Textbox 3318 which identify the messages listed in the list 3306. The viewing section 3304 also includes a Back Button 3320 and a More Button 3322 for controlling the items listed in the List 3306. The View Grief Screen 3300 also includes a Find Button 3324 and a Clear All Button 3326. The Find Button 3324 displays the grief reports received from the machines 102, 302 identified in the Equipment Section 3302. The Clear All Button 3326 removes all items from the List 3306. The List 3306 includes a plurality of rows 3328 and a plurality of columns 3330. The grief reports received from the machines 102, 302 identified in the Equipment Information Section 3302 are displayed in the rows. Parameters of these machines are identified in the columns 3330 including a description 3332 of the received grief report.

Figure 34:
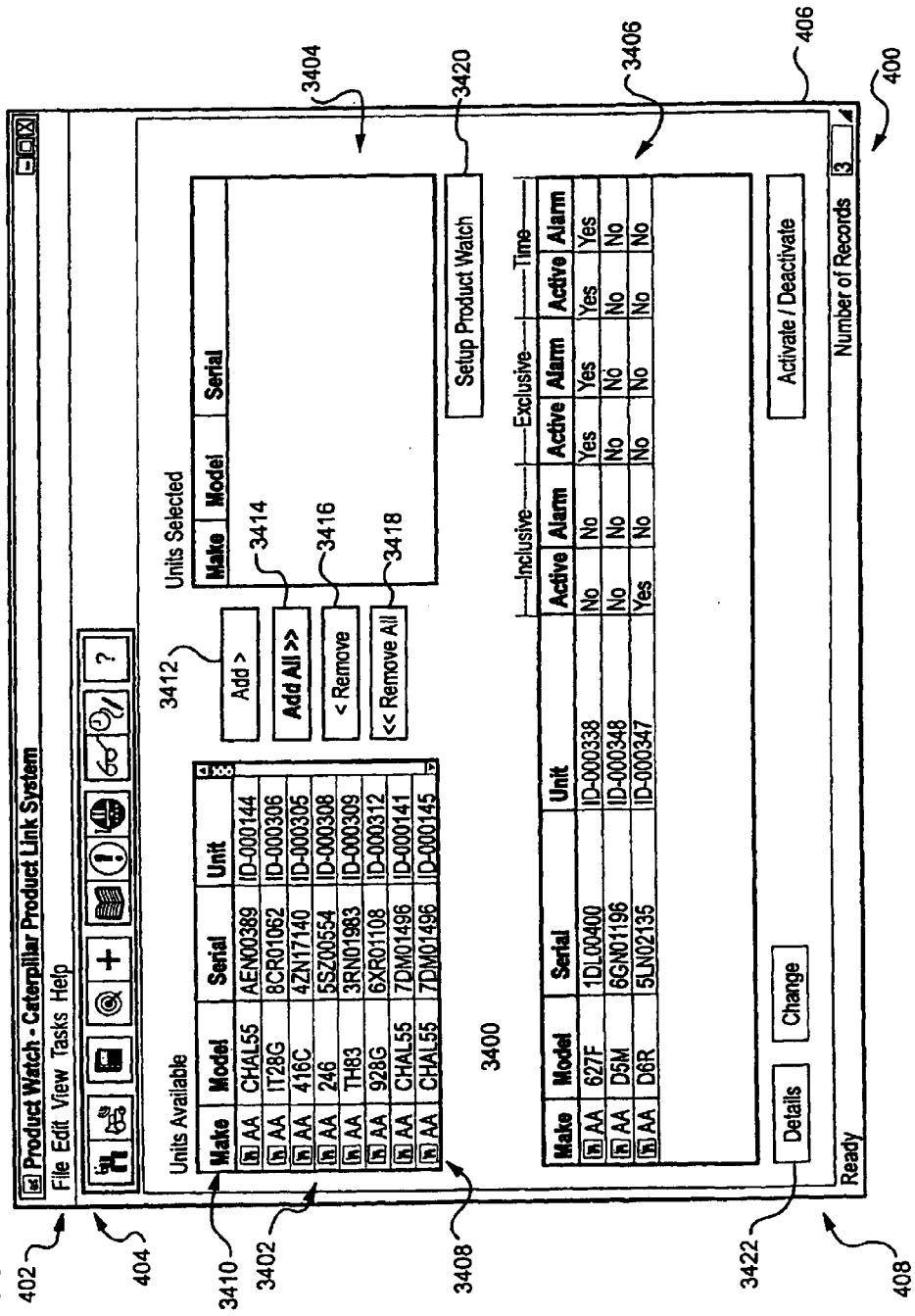
FIG. 34 is a diagrammatic illustration of a Product Watch Screen, according to an embodiment of the present invention.

With reference to FIG. 34, upon actuation of the Product Watch Button 1020, a Product Watch Screen 3400 is displayed in the Product Link System Panel 406. The Product Watch Screen 3400 allows the user 110 to set up a product watch for a particular machine or groups of machines 102,302.

The Product Watch Screen 3400 includes a Units Available Section 3402, a Units Selected Section 3404, and a List 3406. The Units Available Section 3402 includes a plurality of rows 3408 and columns 3410. All of the machines 102, 302 for which data is currently available are listed in the rows and identifying information, i.e., make, model, serial number and unit identifier are listed in the columns 3410.

The Product Watch Screen 3400 also includes an Add Button 3412, an Add All Button 3414, a Remove Button 3416, and a Remove All Button 3418. Actuation of the Add Button 3412 adds selected machines in the Units Available Section 3402 to the Units Selected Section 3404. Actuation of the Add All Button 3414 adds all of the machines in the Units Available Section 3402 to the Units Selected Section 3404. Actuation of the Remove Button 3416 removes the selected machines in the Units Selected Section 3404. Actuation of the Remove All Button 3418 removes all of the machines from the Units Selected Section 3404.

The Product Watch Screen 3400 further includes a Setup Product Watch Button 3420.

Figure 35:
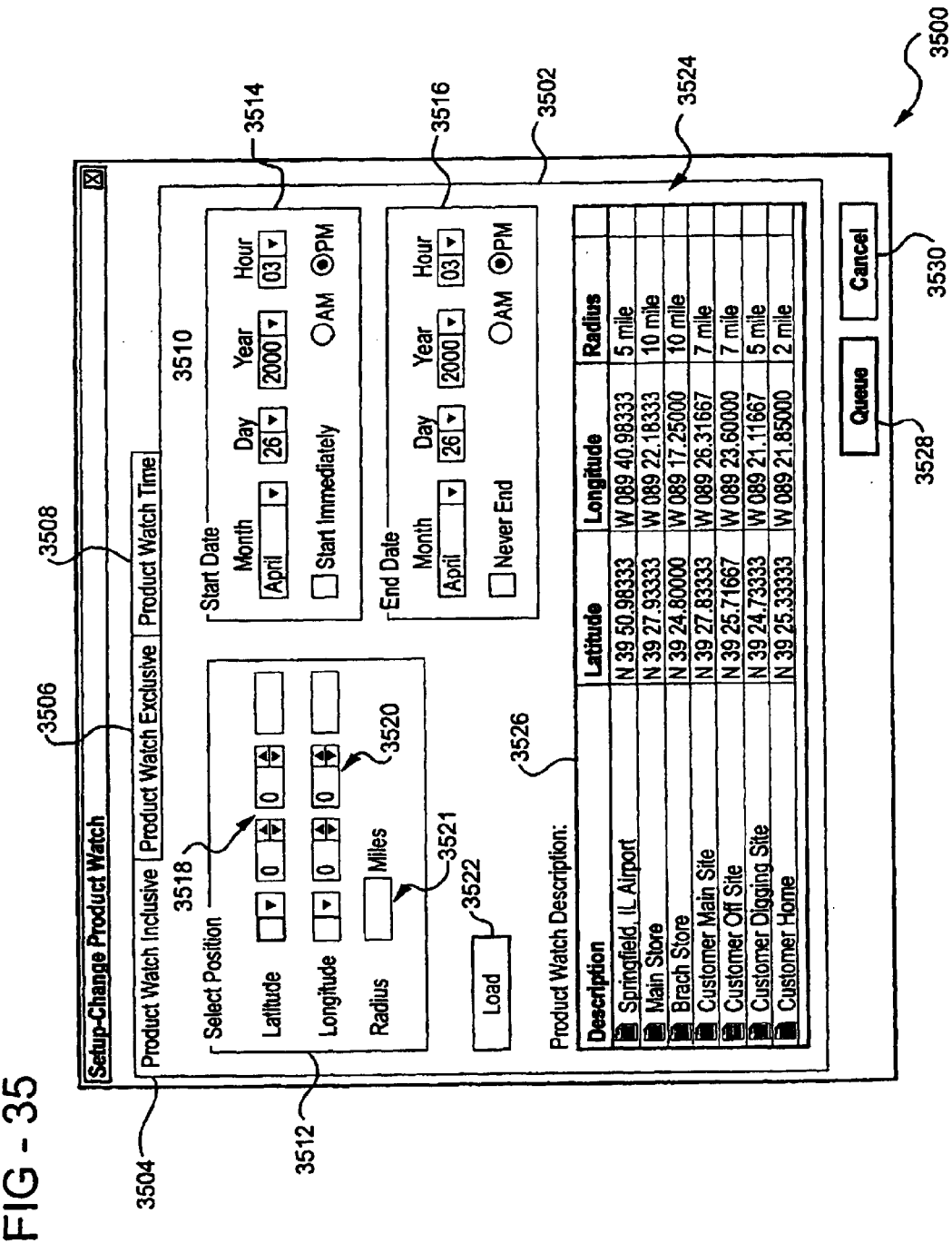
FIG. 35 is a diagrammatic illustration of a Setup-Change Product Watch Dialog, according to an embodiment of the present invention.

With reference to FIG. 35, actuation of the Setup Product Watch Button 3420 displays a Setup-Change Product Watch Dialog 3500. The Setup-Change Product Watch Dialog 3500 allows the user 110 to setup or change the product watch for the machines 102, 302 in the Units Selected Section 3404.

The Setup-Change Product Watch Dialog 3500 includes a Tabbed Panel 3502 having an Inclusive Tab 3504, an Exclusive Tab 3506, and a Watchtime Tab 3508. When the Setup-Change Product Watch Dialog 3500 is initialized, the Inclusive Tab 3504 is initially active.

When the Inclusive Tab 3504 is active an Inclusive Panel 3510 is displayed in the Setup-Change Product Watch Dialog 3500. The Inclusive Panel 3510 includes a Select Position Section 3512, a Start Date Section 3514, and an End Date Section 3516. The Select Position Section 3512 includes a Latitude Input Section 3518, a Longitude Input Section 3520, and a Radius Input 3521.

The user 110 may manipulate the Select Position Section 3512, the Start Date Section 3514 and the End Date Section 3516 to determine when and where the product watch is in effect. With regard to the geographic location set in the Select Position Section 3512, the product watch is only effective when the machine or machines 102, 302 are within a given radius of the selected position.

The Setup-Change Product Watch Dialog 3500 further includes a Load Button 3522 and a List 3524. Actuation of the Load Button 3522 loads the current data into the List 3524. The List 3524 lists all loaded product watches for the machines in the Units Selected Section 3404. The List 3524 includes a modifiable Description Field 3526.

The Setup-Change Product Watch Dialog 3500 also includes a Queue Button 3528 and a Cancel Button 3530. Actuation of the Queue Button 3528 delivers the product watch parameters to the system 100. Actuation of the Cancel Button 3530 closes the Setup-Change Product Watch Dialog 3500.

Figure 36:
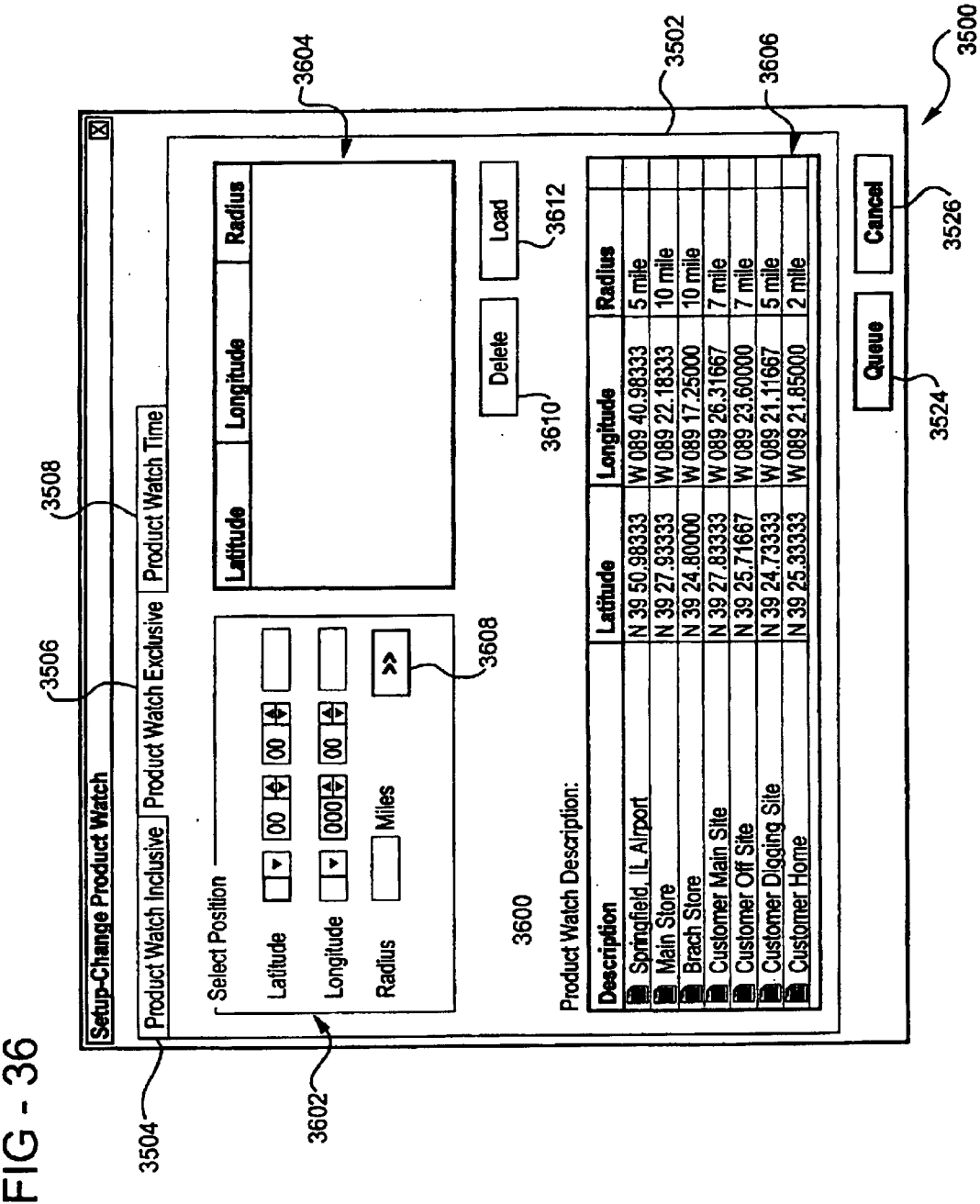
FIG. 36 is a diagrammatic illustration of a Setup-Change Product Watch Dialog with an Exclusive Panel, according to an embodiment of the present invention.

With reference to FIG. 36, when the Exclusive Tab 3506 is active, an Exclusive Panel 3600 is displayed in the Setup-Change Product Watch Dialog 3500. The Exclusive Panel 3600 includes a Select Position Section 3602, List Box 3604 and a List 3606. The Select Position Section 3602 includes a Button 3608. Actuation of the Button 3608 adds the information in the Select Position Section 3602 to the List Box 3604.

The Exclusive Panel 3600 also includes a Delete Button 3610 and a Load Button 3612. Actuation of the Delete Button 3610 deletes the selected items in the List Box 3604. Actuation of the Load Button 3612 adds the selected item in the List 3606 into the Select Position Section 3602.

Figure 37:
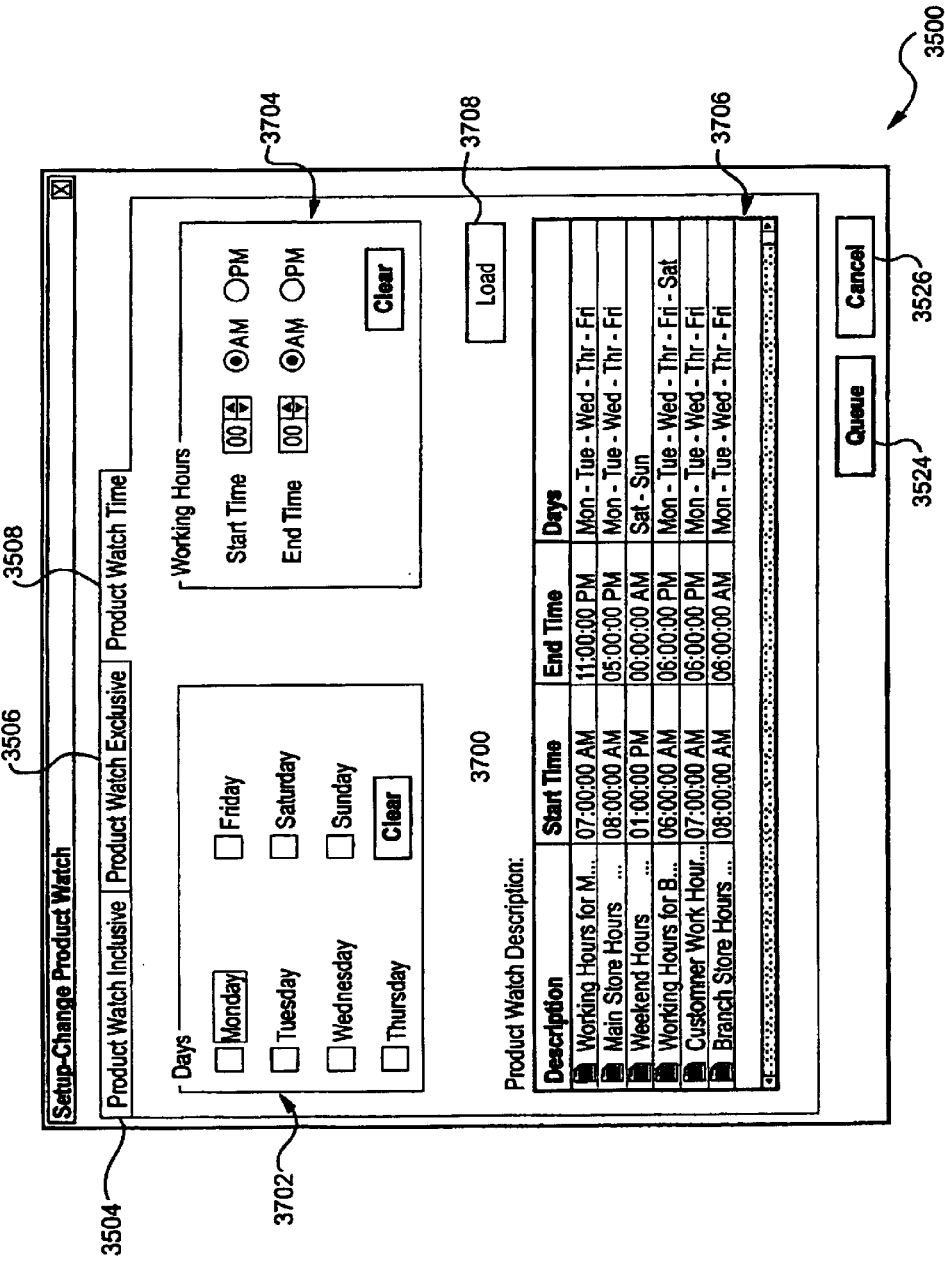
FIG. 37 is a diagrammatic illustration of a Setup-Change Product Watch Dialog with a Watchtime Panel, according to an embodiment of the present invention; and, FIG. 38 is a diagrammatic illustration of a Product Watch Details Dialog, according to an embodiment of the present invention.

With reference to FIG. 37, when the Watchtime Tab 3508 is active, a Watchtime Panel 3700 is displayed in the Setup-Change Product Watch Dialog 3500. The Watchtime Panel 3700 includes a Days Section 3702, a Working Hours Section 3704, and a List 3706. The List 3706 contains a list of all product watches for the selected machines 102, 302. The Days Section 3702 and the Working Hours Section 3704 allow the user to select the effective days and hours for the product watch.

The Watchtime Panel 3700 includes a Load Button 3708 for applying the data in the Days Section 3702 and the Working Hours Section 3704 to selected product watches in the List 3706.

Figure 38:
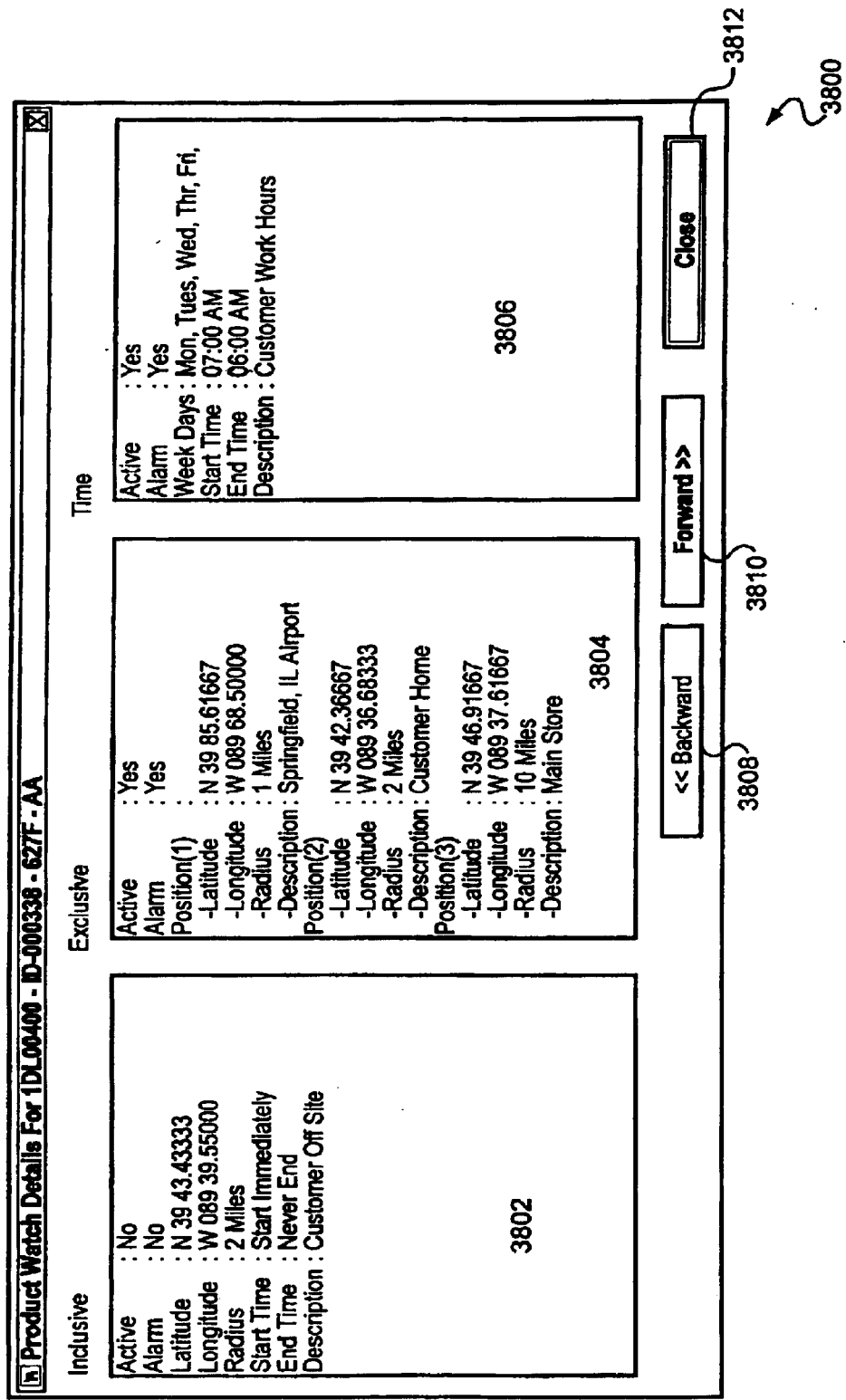

With reference to FIG. 38 upon selection of the Working With Product Watch Descriptions Item 818, a Product Watch Details Dialog 3800 is displayed. The Product Watch Details Dialog 3800 contains detailed information regarding the product watch defined for the selected machine. The Product Watch Details Dialog 3800 includes an Inclusive Text Box 3802, an Exclusive Text Box 3804, and a Time Text Box 3806.

The Product Watch Details Dialog 3800 also includes a Backward Button 3808, a Forward Button 3810 and a Close Button 3812. Actuation of the Backward Button 3808 displays product watch information for a previous machine. Actuation of the Forward Button 3810 displays product watch information for a next machine. Actuation of the Close Button 3812 dismisses the Product Watch Details Dialog 3800.

Other aspects, objects and advantages of this invention can be obtained from a study of the drawings, the disclosure and the appended claims.

INDUSTRIAL APPLICABILITY

The present invention provides a method and system 100 for relaying information between a plurality of machines 102, 302 and a central location 112, 310 and displaying the information for a selected subset of the machines 102, 302. For example, the central location 112, 310 may be located at a work machine dealer's facility. The dealer may receive information for all of the work machines that the dealer has sold and/or on which the dealer performs maintenance.

The present invention allows the user 110 at the central location 112, 310 to view the data for a select subset of machines 102, 302 according to a set of machine parameters. The system 100 allows the user 110 to place limits or ranges on the machine parameters to limit the subset. The system also allows the user 110 to send commands to an individual machine or machines 102, 302.

Using the present invention the user 110 can view information only from the machines of interest or from all machines 102, 302 from which information is received.

Other aspects, objects, and features of the present invention can be obtained from a study of the drawings, the disclosure, and the appended claims.

What is claimed is:

1. A method for displaying information relating to the status of at least one machine of a plurality of machines, including the steps of:
    relaying information from the plurality of machines to a central location over a communications data link;
    selecting a subset of machines from the plurality of machines as a function of machine parameters;
    displaying information relayed from only the subset of machines.

2. A method, as set forth in claim 1, wherein the machine parameters includes at least one of a machine make, a machine model, a machine serial number and a machine identifier.

3. A method, as set forth in claim 1, wherein the machine parameters includes a distance from a selected location.

4. A method, as set forth in claim 1, wherein the machine parameters includes a rental status.

5. A method, as set forth in claim 1, wherein the machine parameters includes a registration status.

6. A method, as set forth in claim 1, wherein the information relayed from the machine includes a date and time stamp.

7. A method, as set forth in claim 1, wherein the information relayed from the machine includes a service meter update.

8. A method, as set forth in claim 1, wherein the information relayed from the machine includes a fuel level.

9. A method, as set forth in claim 1, wherein the information relayed from the machine includes a location.

10. A method, as set forth in claim 1, wherein the information relayed from the machine includes diagnostic information.

11. A method, as set forth in claim 1, wherein the information relayed from the machine includes status information.

12. A method, as set forth in claim 1, wherein the central location is a dealer.

13. A method for displaying information relating to the status of at least one machine of a plurality of machines, including the steps of:
    relaying information from the plurality of machines to a central location over a communications data link;
    selecting a subset of machines from the plurality of machines as a function of machine parameters input by a user;
    displaying information relayed from only the subset of machines; and, providing a graphical user interface for operation by the user.

14. A method, as set forth in claim 13, including the step of providing a search equipment screen for allowing the user to select the at least one machine from the plurality of machines.

15. A method, as set forth in claim 13, including the step of providing a history dialog for displaying a history of a selected machine.

16. A method, as set forth in claim 13, wherein the history is one of a message, event, and status type.

17. A method, as set forth in claim 13, including the step of providing a send commands screen for sending commands to the machines.

18. A method, as set forth in claim 13, including the step of providing a reports screen for defining a report.

19. A method, as set forth in claim 13, including the step of providing an event reaction screen for defining reactions to specified events.

20. A method, as set forth in claim 13, including the step of providing a view screen for displaying information related to a selected machine.

21. A method, as set forth in claim 20, wherein the displayed information is one of a registry, service meter and grief types.

22. A method, as set forth in claim 13, including the step of providing a product watch screen for defining a product watch for at least one machine.

23. A method for displaying information relating to the status of at least one machine of a plurality of machines, including the steps of:
    relaying information from the plurality of machines to a central location over a communications data link;
    selecting a subset of machines from the plurality of machines as a function of machine parameters; and,
    displaying information relayed from only the subset of machines, wherein the machine parameters includes at least one of a machine make, a machine model, a machine serial number and a machine identifier, a distance from a selected location, a rental status, a registration status, a date and time stamp, a service meter update, and a fuel level.

24. A system for displaying information relating to the status of at least one machine of a plurality of machines, comprising:
    a data module coupled to each of the plurality of machines, the data module adapted to collect and store information related to a corresponding machine;
    a datalink coupled to the data module; and,
    a display module coupled to the datalink, the datalink being adapted to transmit data and information between the data module coupled to each machine and the display module, the display module being adapted to display information relayed from only a subset of the plurality of machines, the subset selected from the plurality of machines as a function of machine parameters input by a user.

25. A system, as set forth in claim 24, wherein the machine parameters includes at least one of a machine make, a machine model, a machine serial number and a machine identifier.

26. A system, as set forth in claim 24, wherein the machine parameters includes a distance from a selected location.

27. A system, as set forth in claim 24, wherein the machine parameters includes a rental status.

28. A system, as set forth in claim 24, wherein the machine parameters includes a registration status.

29. A system, as set forth in claim 24, wherein the information relayed from the machine includes a date and time stamp.

30. A system, as set forth in claim 24, wherein the information relayed from the machine includes a service meter update.

31. A system, as set forth in claim 24, wherein the information relayed from the machine includes fuel level.

32. A system, as set forth in claim 24, wherein the information relayed from the machine includes a location.

33. A system, as set forth in claim 24, wherein the information relayed from the machine includes diagnostic information.

34. A system, as set forth in claim 24, wherein the information relayed from the machine includes status information.

35. A system for displaying information relating to the status of at least one machine of a plurality of machines, comprising:
    a data module coupled to each of the plurality of machines, the data module adapted to collect and store information related to a corresponding machine;
    a datalink coupled to the data module;
    a display module coupled to the datalink, the datalink being adapted to transmit data and information between the data module coupled to each machine and the display module, the display module being adapted to display information relayed from only a subset of the plurality of machines, the subset selected from the plurality of machines as a function of machine parameters input by a user; and,
    a graphical user interface for operation by the user.

36. A system, as set forth in claim 35, including a search equipment screen for allowing the user to select the at least one machine from the plurality of machines.

37. A system, as set forth in claim 35, including a history dialog for displaying a history of a selected machine.

38. A system, as set forth in claim 35, wherein the history is one of a message, event, and status type.

39. A system, as set forth in claim 35, including a send commands screen for sending commands to the machines.

40. A system, as set forth in claim 35, including a reports screen for defining a report.

41. A system, as set forth in claim 35, including an event reaction screen for defining reactions to specified events.

42. A system, as set forth in claim 35, including a view screen for displaying information related to a selected machine.

43. A system, as set forth in claim 42, wherein the displayed information is one of a registry, service meter and grief types.

44. A system, as set forth in claim 35, including a product watch screen for defining a product watch for at least one machine.

45. A system for displaying information relating to the status of at least one machine of a plurality of machines, comprising:
    a data module coupled to each of the plurality of machines, the data module adapted to collect and store information related to a corresponding machine;
    a datalink coupled to the data module; and
    a display module coupled to the datalink, the datalink being adapted to transmit data and information between the data module coupled to each machine and the display module, the display module being adapted to display information relayed from only a subset of the plurality of machines, the subset selected from the plurality of machines as a function of machine parameters input by a user, wherein the machine parameters includes at least one of a machine make, a machine model, a machine serial number and a machine identifier, a distance from a selected location, a rental status, a registration status, a date and time stamp, a service meter update, and a fuel level.

46. A computer program product for displaying information relating to the status of at least one machine of a plurality of machines, wherein information from the plurality of machines is relayed to a central location over a communications data link, comprising:

computer readable program code means for selecting a subset of machines from the plurality of machines as a function of machine parameters; and, computer readable program code means for displaying information relayed from only the subset of machines.

47. A computer program product, as set forth in claim 46, wherein the machine parameters includes at least one of a machine make, a machine model, a machine serial number and a machine identifier.

48. A method for displaying information relating to the status of at least one product of a plurality of products, including the steps of:

relaying information from the plurality of products to a central location over a communications data link;

selecting a subset of products from the plurality of products as a function of product parameters;

displaying information relayed from the subset of products.

49. A method for displaying information relating to the status of at least one machine of a plurality of machines, including the steps of:

relaying information from the plurality of machines to a central location over a communications data link;

selecting a subset of machines from the plurality of machines as a function of the relayed information; and displaying information relayed from the subset of machines.

50. A method, as set forth in claim 49, wherein said relayed information includes a plurality of machine parameters.

\* \* \* \* \*